(12) United States Patent
Erwin et al.

(10) Patent No.: US 10,363,907 B2
(45) Date of Patent: Jul. 30, 2019

(54) FLUID EXCHANGE MACHINE

(71) Applicant: BG Intellectuals, Inc., Wichita, KS (US)

(72) Inventors: Michael J. Erwin, Augusta, KS (US); Harold E. Erwin, Augusta, KS (US); Jeffrey T. Brummett, Wichita, KS (US)

(73) Assignee: BG Intellectuals, Inc., Wichita, KS (US)

( * ) Notice: Subject to any disclaimer, the term of this patent is extended or adjusted under 35 U.S.C. 154(b) by 280 days.

(21) Appl. No.: 15/137,602

(22) Filed: Apr. 25, 2016

(65) Prior Publication Data

US 2016/0236657 A1 Aug. 18, 2016

Related U.S. Application Data

(63) Continuation-in-part of application No. 13/870,665, filed on Apr. 25, 2013, now Pat. No. 9,322,306.
(Continued)

(51) Int. Cl.
*B60S 5/00* (2006.01)
*B67D 7/78* (2010.01)
(Continued)

(52) U.S. Cl.
CPC ............. *B60S 5/00* (2013.01); *B67D 7/221* (2013.01); *B67D 7/3245* (2013.01); *B67D 7/62* (2013.01);
(Continued)

(58) Field of Classification Search
CPC .. F01M 11/04; F01M 11/045; F01M 11/0458; F16H 57/0408; B60S 5/00
See application file for complete search history.

(56) References Cited

U.S. PATENT DOCUMENTS 4,095,673 A 6/1978 Takeuchi
5,370,160 A 12/1994 Parker
(Continued)

OTHER PUBLICATIONS

International Search Report and Written Opinion dated Sep. 7, 2017 in International Patent Application No. PCT/US17/29404, 13 pages.
(Continued)

*Primary Examiner* — Timothy L Maust
*Assistant Examiner* — Timothy P. Kelly
(74) *Attorney, Agent, or Firm* — Shook Hardy & Bacon, LLP

(57) ABSTRACT

A machine for replacing used transmission or power steering fluid in a vehicle with new transmission or power steering fluid includes a frame having a housing. The machine includes a pair of service hoses that extend from the machine and connect to the vehicle for placing the machine in the fluid flow. New, used, and axillary fluid tanks are provided. A pump and a manifold are associated with two of the tanks. The pumps provide for the selective withdraw or insertion of fluid into or out of the tanks. A display on the housing presents an operator of the machine with various tasks or options the machine can perform. A processor controls activation of the pumps and other electrical components based on inputs received by the display. Scales are provided under one or more of the tanks for determining the amount of fluid going into and out of the tanks during the exchange process.

13 Claims, 43 Drawing Sheets

Related U.S. Application Data

(60) Provisional application No. 61/638,121, filed on Apr. 25, 2012.

(51) Int. Cl.

| | | |
|---|---|---|
| *B67D 7/62* | (2010.01) | |
| *B67D 7/84* | (2010.01) | |
| *B67D 7/32* | (2010.01) | |
| *B67D 7/22* | (2010.01) | |
| *F04B 23/02* | (2006.01) | |
| *F04B 49/06* | (2006.01) | |
| *F01M 11/04* | (2006.01) | |
| *F16H 57/04* | (2010.01) | |

(52) U.S. Cl.
CPC ............... *B67D 7/78* (2013.01); *B67D 7/845* (2013.01); *F01M 11/045* (2013.01); *F01M 11/0458* (2013.01); *F04B 23/02* (2013.01); *F04B 49/065* (2013.01); *F16H 57/0408* (2013.01)

(56) References Cited

U.S. PATENT DOCUMENTS

| | | |
|---|---|---|
| 5,447,184 A | 9/1995 | Betancourt et al. |
| 5,626,170 A | 5/1997 | Parker et al. |
| 5,743,357 A | 4/1998 | Few et al. |
| 5,853,068 A | 12/1998 | Dixon et al. |
| 5,951,857 A | 9/1999 | Osborne |
| 6,134,896 A | 10/2000 | Brown et al. |
| 6,330,934 B1 | 12/2001 | Viken |
| 6,382,271 B1 | 5/2002 | Betancourt et al. |
| 6,684,714 B2 | 2/2004 | Mills et al. |
| 6,722,397 B2 | 4/2004 | Few |
| 6,722,398 B2 | 4/2004 | Few |
| 6,729,364 B2 | 5/2004 | Few et al. |
| 6,772,802 B2 | 8/2004 | Few |
| 6,779,633 B2 | 8/2004 | Viken |
| 6,830,082 B2 | 12/2004 | Few |
| 6,877,531 B2 | 4/2005 | Few |
| 6,886,606 B2 | 5/2005 | Few et al. |
| 6,959,740 B2 | 11/2005 | Few |
| 6,986,283 B2 | 1/2006 | Mills et al. |
| 8,104,522 B2 | 1/2012 | Flournoy |
| 2004/0194616 A1 | 10/2004 | Few |
| 2005/0067048 A1 | 3/2005 | Few |
| 2005/0098226 A1 | 5/2005 | Rounds et al. |
| 2010/0154927 A1 | 6/2010 | Flournoy |
| 2011/0194953 A1 | 8/2011 | Schalk et al. |
| 2013/0213523 A1 | 8/2013 | Allen et al. |
| 2013/0287593 A1 | 10/2013 | Erwin et al. |
| 2016/0236657 A1 | 8/2016 | Erwin et al. |

OTHER PUBLICATIONS

Non-Final Office Action dated Jul. 30, 2015 in U.S. Appl. No. 13/870,665, 9 pages.
Notice of Allowance dated Dec. 18, 2015 in U.S. Appl. No. 13/870,665, 7 pages.
MotorVac Technologies, MOTORVAC Trans Tech III MIT 1100 flyer, updated, © 2009, two pages.
International Preliminary Report on Patentability dated Nov. 8, 2018 in International Patent Application No. PCT/US2017/029404, 8 pages.

ADJUSTING LEVELS

PXT™ IS ADJUSTING THE LEVEL
IN THE TRANSMISSION FOR A
PROPER SERVICE.

6

LEFT TO ADJUST

*FIG. 24.*

ADDING QUICK CLEAN™

PUMP WILL AUTOMATICALLY
SHUT OFF IN
0.8 SECONDS.

FUNNEL IS EMPTY —158

*FIG. 25.*

INSTRUCTIONS

USE THE MACHINE TO EMPTY THE USED TANK AFTER EVERY SERVICE TO KEEP THE LINES FULL.

TO ADD NEW ATF FILL THE JUG THROUGH THE FUNNEL IN THE TOP MARKED "NEW ATF".

 BACK     -- PAGE 4 --     NEXT   ─170

*FIG. 36.*

INSTRUCTIONS

ONCE A SERVICE HAS BEGUN THE MACHINE SHOULD NOT BE MOVED OR BUMPED AS THIS WILL CAUSE THE MACHINE TO READ THE SCALES IMPROPERLY.

IF THE MACHINE IS BUMPED OR MOVED, YOU WILL NEED TO VERIFY THE ACCURACY OF THE EXCHANGE BY CHECKING THE TRANSMISSION LEVEL, AND ADD/REMOVE ATF AS NECESSARY.

 BACK     -- PAGE 5 --     NEXT   ─170

*FIG. 37.*

SERVICE COMPLETE

12 LITER SERVICE FINISHED.

BG QUICK CLEAN WAS ADDED.

SERVICE COMPLETE

12 QUART SERVICE FINISHED.

BG QUICK CLEAN WAS NOT ADDED.

FLUID EXCHANGE MACHINE

CROSS-REFERENCE TO RELATED APPLICATIONS

This application, is a Continuation-in-Part of U.S. patent application Ser. No. 13/870,665, entitled "TRANSMISSION FLUID EXCHANGE MACHINE," filed Apr. 25, 2013, which claims the benefit of and priority to commonly owned U.S. Provisional Application Ser. No. 61/638,121, filed Apr. 25, 2012, each of which are hereby incorporated by reference in their entirety.

STATEMENT REGARDING FEDERALLY SPONSORED RESEARCH OR DEVELOPMENT

Not applicable.

TECHNICAL FIELD

The present invention relates generally to an apparatus for exchanging various types of used fluid from an automobile and replacing the same with new fluid.

BACKGROUND

As readily understood in the art, automobiles have a transmission fluid in the transmission to reduce the wear between mechanical parts of the transmission. The fluid must be cooled during operation of the vehicle and, accordingly, the transmission fluid sub-system includes a pump which circulates the transmission fluid through the transmission and to and from a radiator via hoses such that the radiator can cool the transmission fluid and return cooled fluid back through the transmission. During the course of operation of the vehicle, the transmission fluid can break down and/or get dirty. The makeup of the transmission system does not lend itself to simply removing a drain plug and draining out used transmission and replacing it with new transmission through a dip stick or fill tube, like with oil changes. Consequently, it is known to insert a fluid exchange machine into the transmission sub-system by disconnecting one of the hoses to or from the radiator and inserting the transmission fluid exchange machine into the system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is generally directed to a fluid exchange machine comprising a frame having a housing, a display coupled with the housing, a new fluid manifold and a used fluid manifold, the new fluid manifold and used fluid manifold coupled with the housing and in fluid communication with each other, an auxiliary fluid tank support structure, a new fluid pump and a used fluid pump, the new fluid pump coupled with the new fluid manifold and the used fluid pump coupled with the used fluid manifold, and a processor coupled with the display for displaying an image having a first icon and a second icon thereon, wherein selecting the first icon controls activation of the new fluid pump and the used fluid pump to perform a first type of fluid exchange, and wherein selecting the second icon controls activation of the new fluid pump and the used fluid pump to perform a second type of fluid exchange.

In another embodiment, the present invention is generally directed to a fluid exchange machine comprising a frame having a housing, a display coupled with the housing, a first fluid manifold and a second fluid manifold, wherein the first fluid manifold and the second fluid manifold are coupled with the housing and in fluid communication with each other, a first fluid pump and a second fluid pump, the first fluid pump coupled with the first fluid manifold and the second fluid pump coupled with the second fluid manifold, a processor coupled with the display for displaying an image having a first icon and a second icon thereon, wherein selecting the first icon controls activation of the first fluid pump and the second fluid pump to perform a first type of fluid exchange, and wherein selecting the second icon controls activation of the first fluid pump and the second fluid pump to perform a second type of fluid exchange, a first fluid tank for holding a first fluid, the first fluid tank supported by the frame, wherein the first fluid pump is in communication with the first fluid tank and is operable to selectively withdraw the first fluid from the first fluid tank and dispense fluid into the first fluid tank, a second fluid tank for holding a second fluid, the second fluid tank supported by the frame, wherein the second fluid pump is in communication with the second fluid tank and is operable to selectively withdraw the second fluid from the second fluid tank and dispense fluid into the second fluid tank, a third fluid tank support structure, wherein a lower surface of the third fluid tank support is raised up to 6 inches from a lower surface of the frame, and wherein the third fluid tank support structure further comprises a generally L-shaped bracket, and a third fluid tank enclosed within the third fluid tank support structure, wherein the third fluid tank is adapted to hold a third fluid, and wherein the second fluid pump is in communication with the third fluid tank and is operable to selectively withdraw fluid from the third fluid tank and dispense fluid into the third fluid tank.

In yet another embodiment of the present invention, a method of performing a fluid exchange service on a vehicle using a fluid exchange machine having a display is provided. Generally, the method comprises displaying on the display a selection screen having a first icon and a second icon, wherein selecting the first icon provides the user with a first set of instructions operable to perform a first type of fluid exchange, and wherein selecting the second icon provides the user with a second set of instructions operable to perform a second type of fluid exchange.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views:

FIGS. 16-47 are drawings illustrating sample user interfaces displayed on a display of the machine for operating the machine of FIG. 1 to perform various tasks.

DETAILED DESCRIPTION

Figure 1:
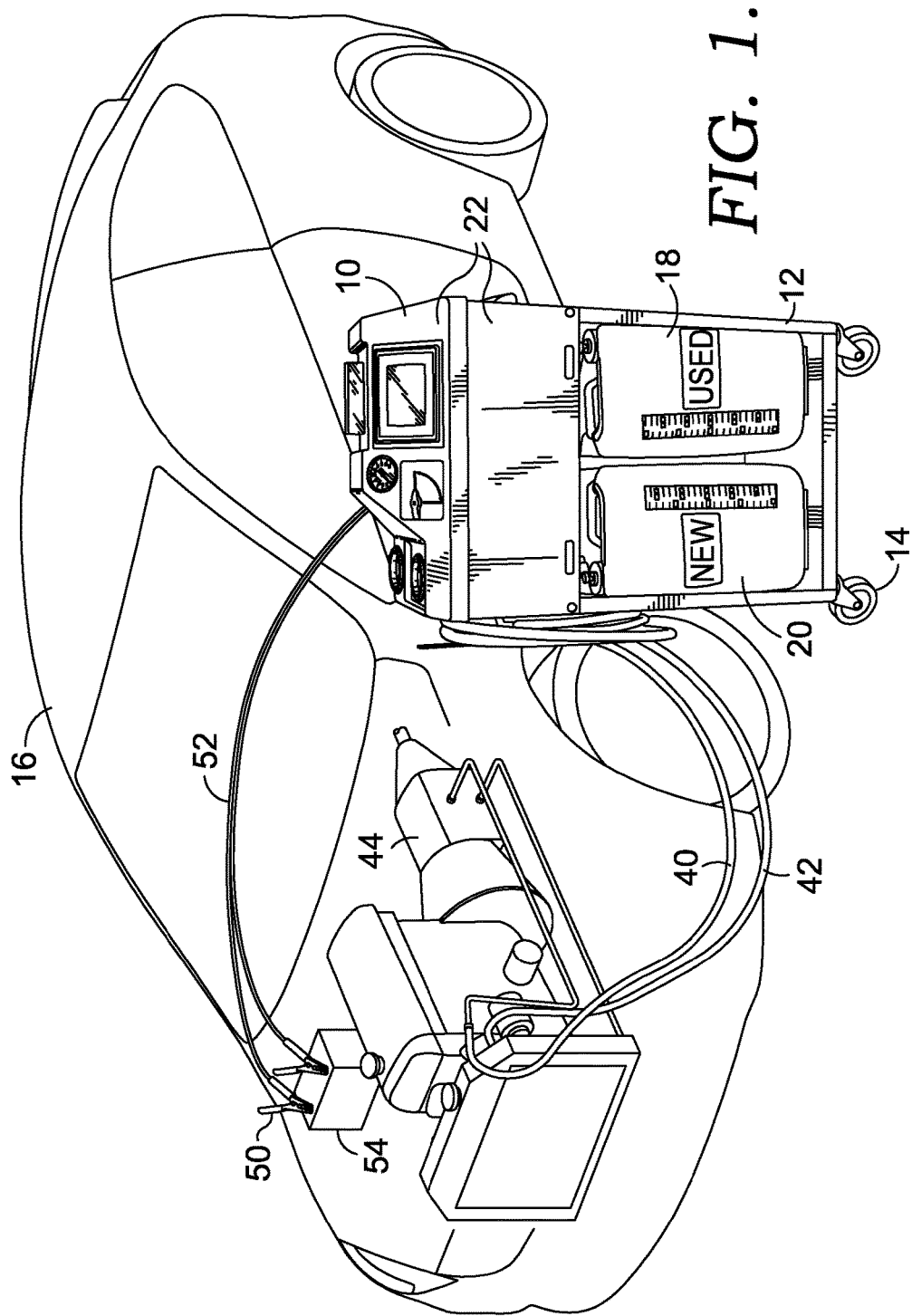
FIG. 1 is a perspective view of an embodiment of a transmission fluid exchange machine of the present invention hooked to an automobile to perform an exchange service.
Figure 2:
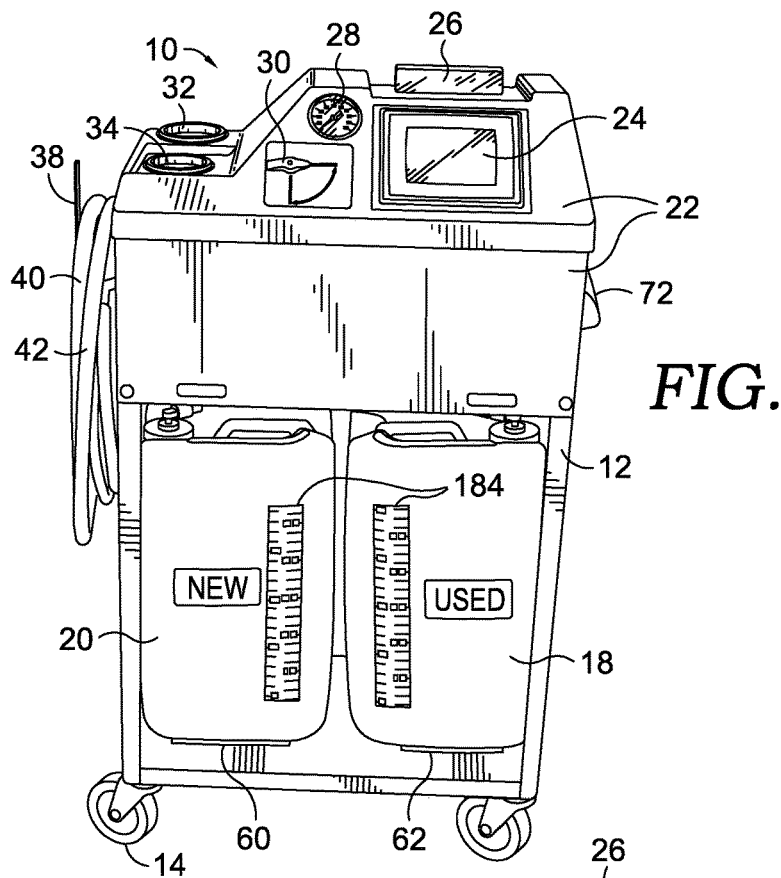
FIG. 2 is a front perspective view of the machine of FIG. 1.

Referring now to the drawings in more detail and initially to FIG. 1, numeral 10 generally designates a transmission fluid exchange machine constructed in accordance with an embodiment of the present invention. The machine 10 includes a cart-like frame 12 that sits on casters 14 to enable an operator to roll the machine 10 to a vehicle 16 to be serviced. Sitting in the frame 12 are two fluid tanks 18, 20 of preferably comparable size. One of the tanks 18 will store the removed, used automatic transmission fluid, while the other tank 20 will store new automatic transmission fluid. Above the tanks 18, 20, the frame 12 includes a housing 22 that conceals various components of the machine 10, which will be discussed in greater detail below. On the exterior of the housing 22, as seen in FIG. 2, there is a display 24, a sight glass or tube 26, a pressure gauge 28, a valve control lever 30, and a pair of funnels 32, 34. On the left side 36 of the housing 22 are hooks 38 which hold two hoses 40, 42 that connect to the vehicles' transmission system 44 to bring fluid into the machine 10 and send fluid back out of the machine 10.

Figure 3:
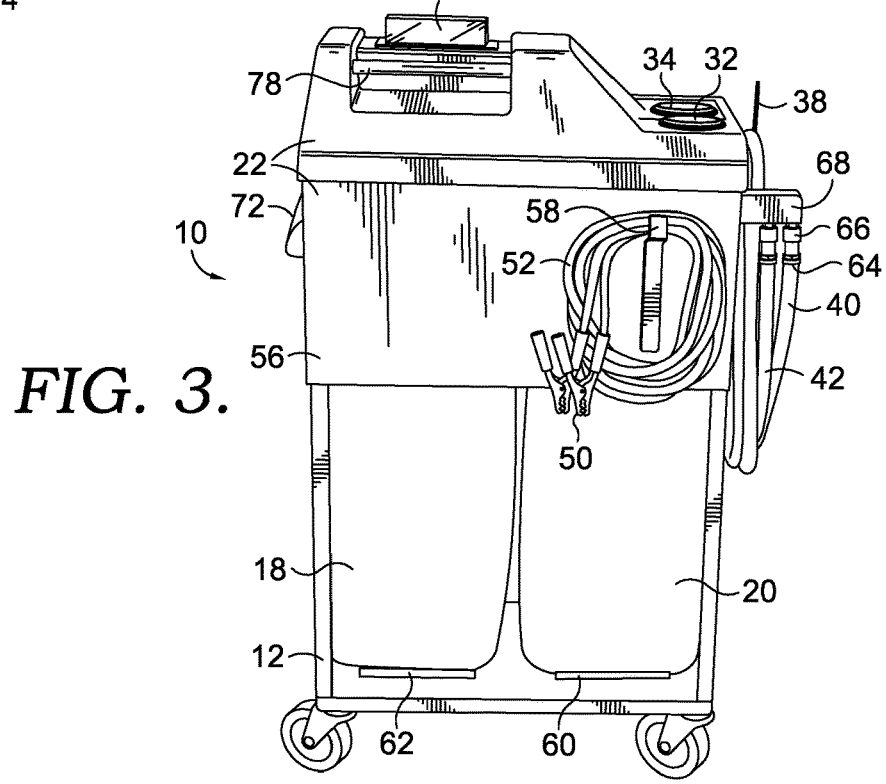
FIG. 3 is a rear perspective view of the machine of FIG. 1.

FIG. 3 shows a rear view of the machine 10. In addition to electronics that drive the display 24, the machine 10 also has a pair of pumps 46, 48 which will be discussed in greater detail below. The pumps 46, 48 and the display 24 are powered by connecting the machine 10 to the vehicle's electrical system by way of a pair of clamps 50 that connect via cables 52 to the battery 54 of the vehicle 16. The cables 52 and clamps 50 are visible on a rear 56 of the machine 10, where they are held by a bracket 58.

This particular machine 10, in order to keep a balance between the amount of fluid removed and the amount of fluid replaced, uses a pair of scales 60, 62 to determine the weights of the two tanks 18, 20 during the fluid exchange process. The scales 60, 62 are positioned underneath the tanks 18, 20 and are viewable below the tanks 18, 20 in FIG. 3. Also visible in FIG. 3 is a location where free ends 64 of the two fluid hoses 40, 42 can connect to the machine 10 via quick couplings 66 on an underneath side of a hose bracket 68 projecting from the left side 36 of the machine 10 (see also FIG. 5). While the present embodiment uses scales 60, 62 to determine the volumes of the two tanks 18, 20, alternate methods of determining the volume can be used. For example, optical sensors (not shown) may be placed on an underneath side of the housing to look down into the tanks 18, 20. Signals can be sent down and reflected off of an upper surface of the fluids to determine the fluid level. The distance the signals travel can tell where the fluid level is in each of the tanks 18, 20, which can be used to calculate the volume of fluid in each of the tanks 18, 20.

Figure 4:
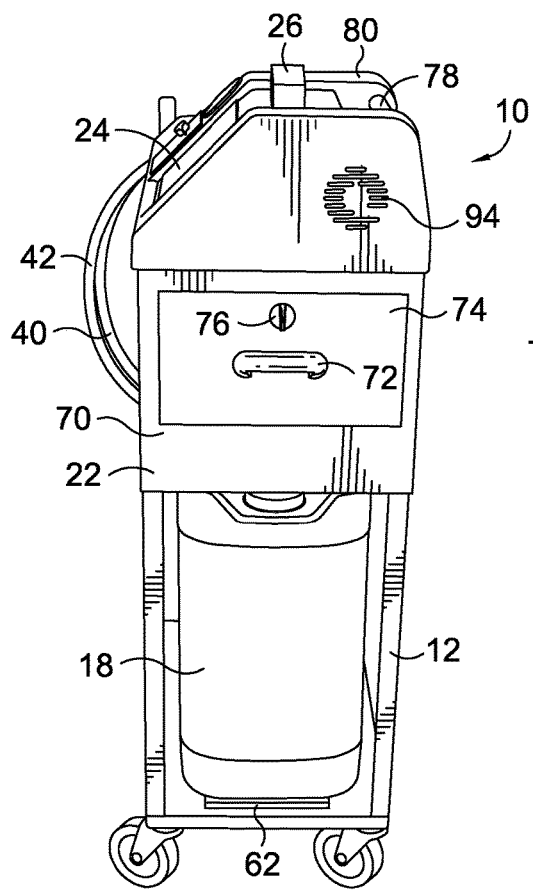
FIG. 4 is a right side perspective view of the machine of FIG. 1.

FIG. 4 discloses a view of a right side 70 of the machine 10. A drawer handle 72 extends outwardly from a drawer 74 in the right side 70 of the housing 22. The drawer provides storage for items related to the machine 10, such as manuals and parts. The drawer handle 72 also permits an operator to pull the machine 10 around to various vehicles 16 when the drawer 74 is locked in a closed position by a latch 76. Another or upper handle 78 is partially visible adjacent an upper surface 80 of the housing 22, but is more readily visible in FIG. 3.

Figure 5:
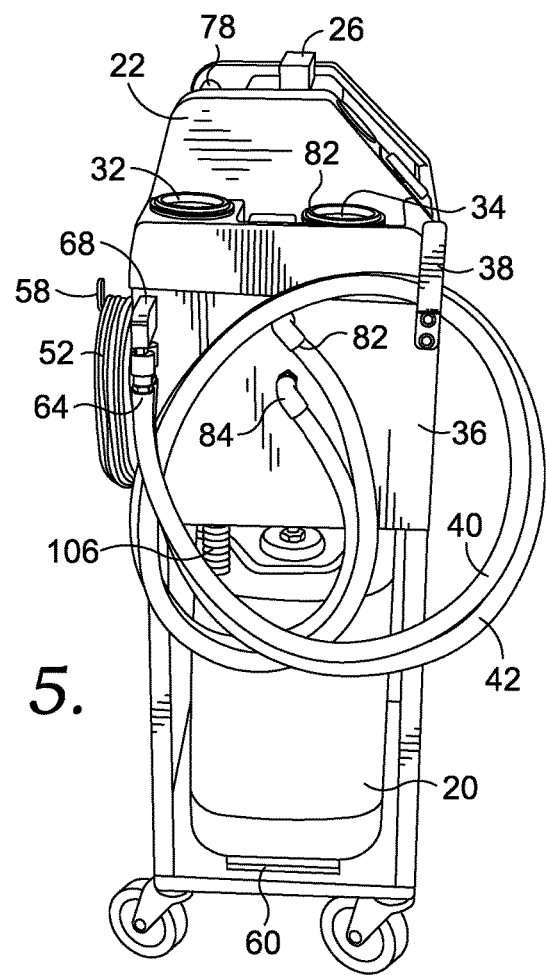
FIG. 5 is a left side perspective view of the machine of FIG. 1.

FIG. 5 discloses a view of the left side 36 of the machine 10. The two hoses 40, 42 are a threadably coupled with the machine 10 at their proximal ends 82 using a pair of 90° elbows 84. The quick couplings 66 at the distal ends 64 of the hoses 40, 42 allows an operator to quickly uncouple the hoses 40, 42 from the hose bracket 68 and connect them into the vehicle's sub-system. The funnels 32, 34 are visible above the hose connections. In this particular figure, the funnels 32, 34 have lids or caps 86 placed thereon.

Figure 6:
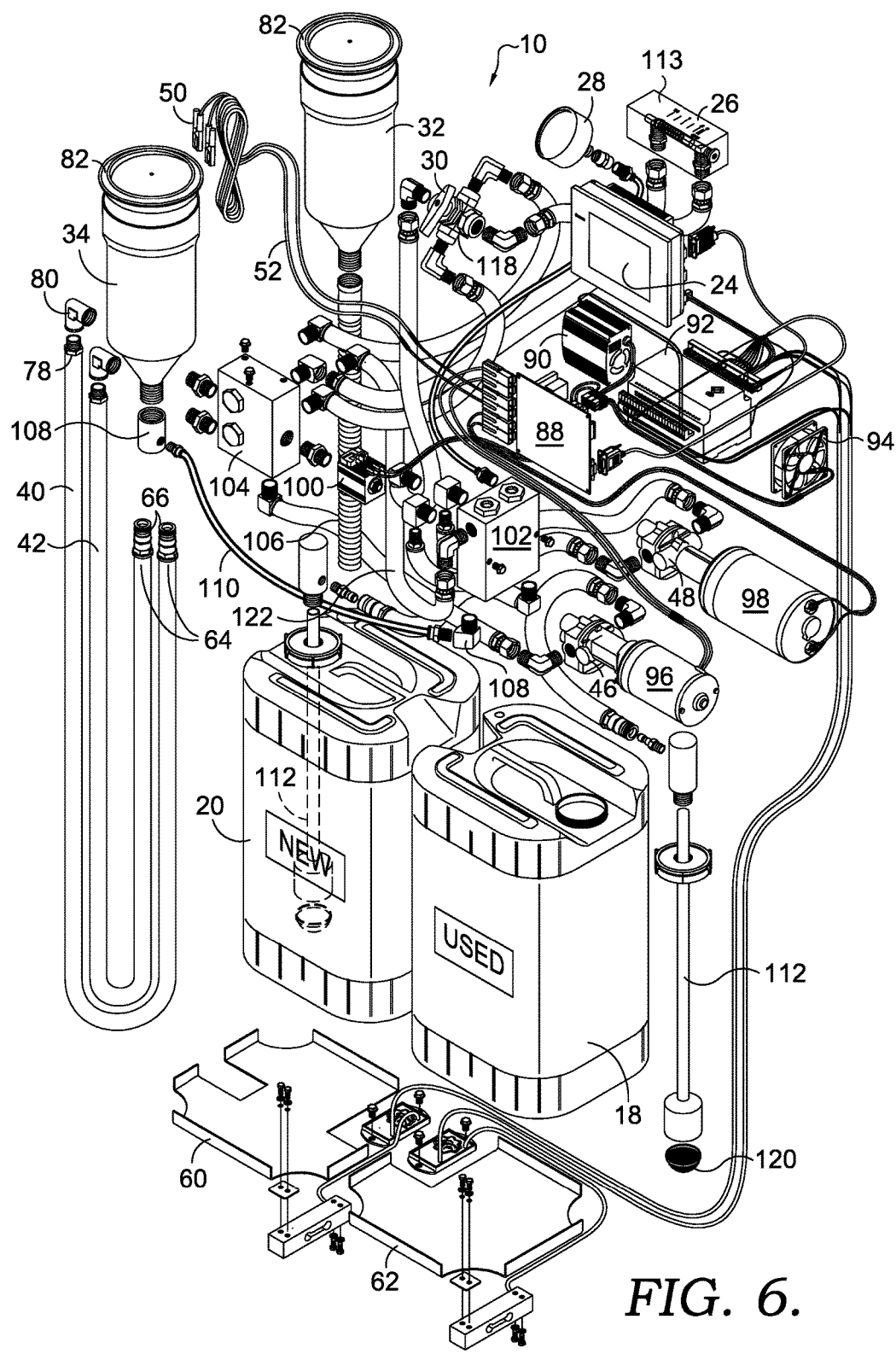
FIG. 6 is an enlarged, exploded, perspective view of the machine of FIG. 1, from a front, top, right vantage point, and with a frame and housing removed to reveal various components of the machine.

FIG. 6 is an exploded view of various internal components of the machine that are generally obstructed by the housing 22 and frame 12, which have been omitted in this figure for clarity. The internal components include both electrical components and plumbing components. The electrical components include a printed circuit board ("PCB") 88 that is electrically coupled to a power controller 90, a programmable logic controller ("PLC") 92, and a cooling fan 94. The power controller 90 may include a transformer and/or an inverter for regulating the power to the machine 10. The PLC 92, as would be understood by one of ordinary skill in the art, is for controlling various components of the machine 10. Also coupled with the PCB 88 are motors 96, 98 that drive the pumps 46, 48, respectively. A solenoid valve 100 is also connected to the PCB 88. The display 24 and the scales 60, 62 are coupled with the PLC 92. The PCB and PLC may be collectively referred to herein as a processor as they collectively execute computer programs and containing a processing unit and a control unit. The operation of these components will be discussed in greater detail below. The electrical components also include a plurality of unnumbered wires, cables, and connectors that permit the electrical components to be in electrical communication (i.e., electrical current and/or signals may pass between them) with each other.

The plumbing components, in addition to those already discussed above (e.g., the funnels 32, 34, the hoses 40, 42, the pumps 46, 48, etc.), also includes a new fluid manifold 102 and a used fluid manifold 104. The manifolds, in the illustrated embodiment, take on the appearance of blocks having various openings or ports 105 therein that communicate with passages or pathways 107 therethrough. The manifolds 102, 104 will be discussed in greater detail below. The new fluid funnel 32 includes a tube 106 that extends from the bottom thereof down into the new fluid tank 20. The chemical funnel 34 is connected to the new fluid manifold 102 by various connectors 108 and a tube 110. Similarly, each tank includes a fluid pickup tube 112 that is coupled with its associated pump 46, 48 via various hoses and connectors. The plumbing components also include a plurality of unnumbered hoses, elbows, tubes, and connectors that permit the plumbing components to be in fluid communication (i.e., fluids may flow between them via various conduits) with each other.

Figure 7:
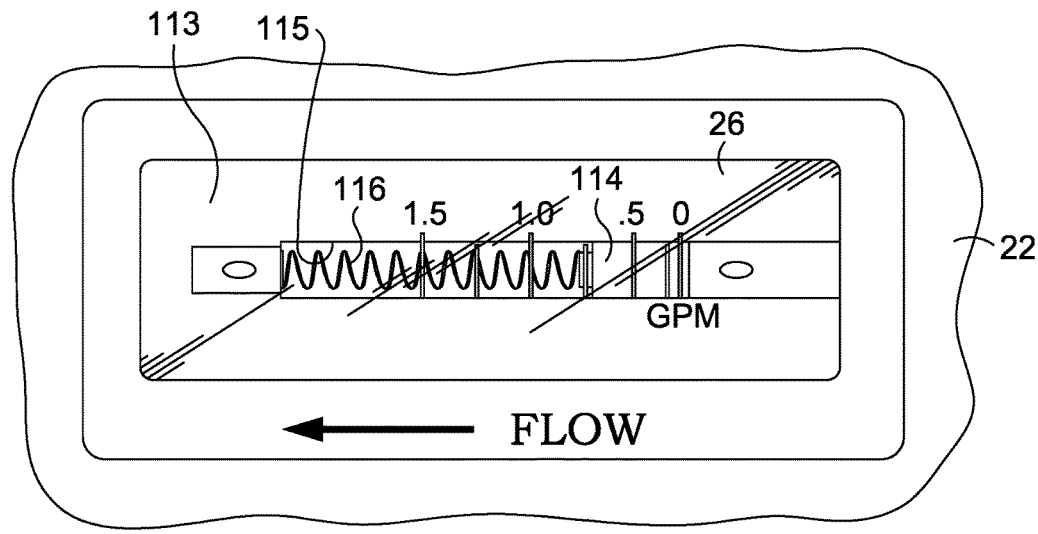
FIG. 7 is an enlarged fragmentary view of a portion of the machine of FIG. 1 illustrating a flow tube.

FIG. 7 is an up close view of the sight tube or sight glass or flow tube 26 of the present invention. It is viewable by the operator on the upper surface 80 of the housing 22. The sight glass 26, in the illustrated embodiment, is preferably a block of transparent material 113, such as glass, plastic, or acrylic, having a passage 115 therethrough. In an alternate embodiment, the sight glass 26 could simply be a clear or transparent tube. When the hoses 40, 42 of the machine 10 are connected with the vehicle's transmission system 44, the machine 10 is in a bypass mode, and the vehicle 16 is turned on, the vehicle's own transmission pump should start circulating the fluid through the vehicle sub-system and through the machine 10 in either direction. If the hoses 40, 42 are connected to the system 44 correctly, fluid will flow through the passage 115 of the sight tube 26 in the direction indicated by the arrow in FIG. 7 and a bullet or slider 114 contained inside the passage 115 in the sight glass 26, which is biased to the right side thereof via a spring 116, will move to the left and compress the spring 116 an amount depending on the amount and force of fluid flow through the sight tube 26 and the bullet 114 (i.e., the bullet 114 has a bore therethrough (not shown) to permit the passage of fluid therethrough). If the machine 10 is hooked into the system 44 in a reverse orientation, the bullet 114 will not move and the operator realizes that the hoses 40, 42 are hooked into the system 44 in a backwards configuration. Fluid, however, will still flow through the sight tube 26, the bullet 114, and the machine 10. Instead of disconnecting the hoses 40, 42 and switching them around, the operator may simply change the orientation of the hoses 40, 42 by using the valve control lever 30 on the upper surface 80 to correct the flow. A proper direction of fluid flow through the machine 10 is important to ensure that fluid enters the manifolds 102, 104 in one direction so the manifolds function properly.

Figure 8:
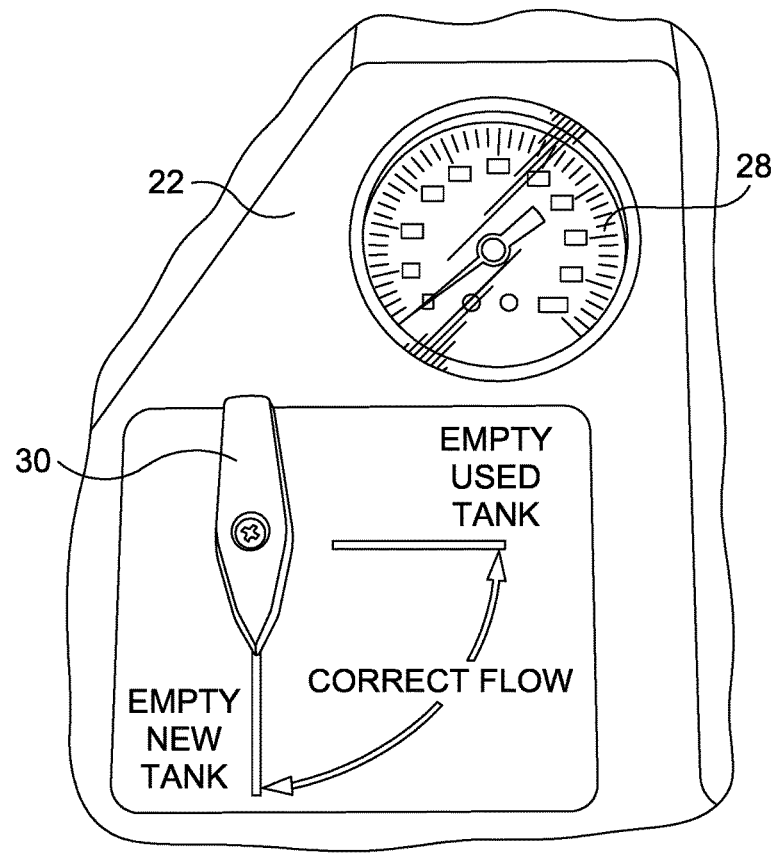
FIG. 8 is an enlarged fragmentary view of a portion of the machine of FIG. 1 illustrating a valve control lever.

FIG. 8 shows the valve control lever 30 that the operator may turn 90° to rotate a ball valve 118 positioned beneath the housing 22 to correct the flow of the fluid through the ball valve 118 and through the machine 10 itself. The pressure gauge 28 informs the operator of the working pressure of the fluid in the vehicle 16 and the machine 10 during operation.

Figure 9:
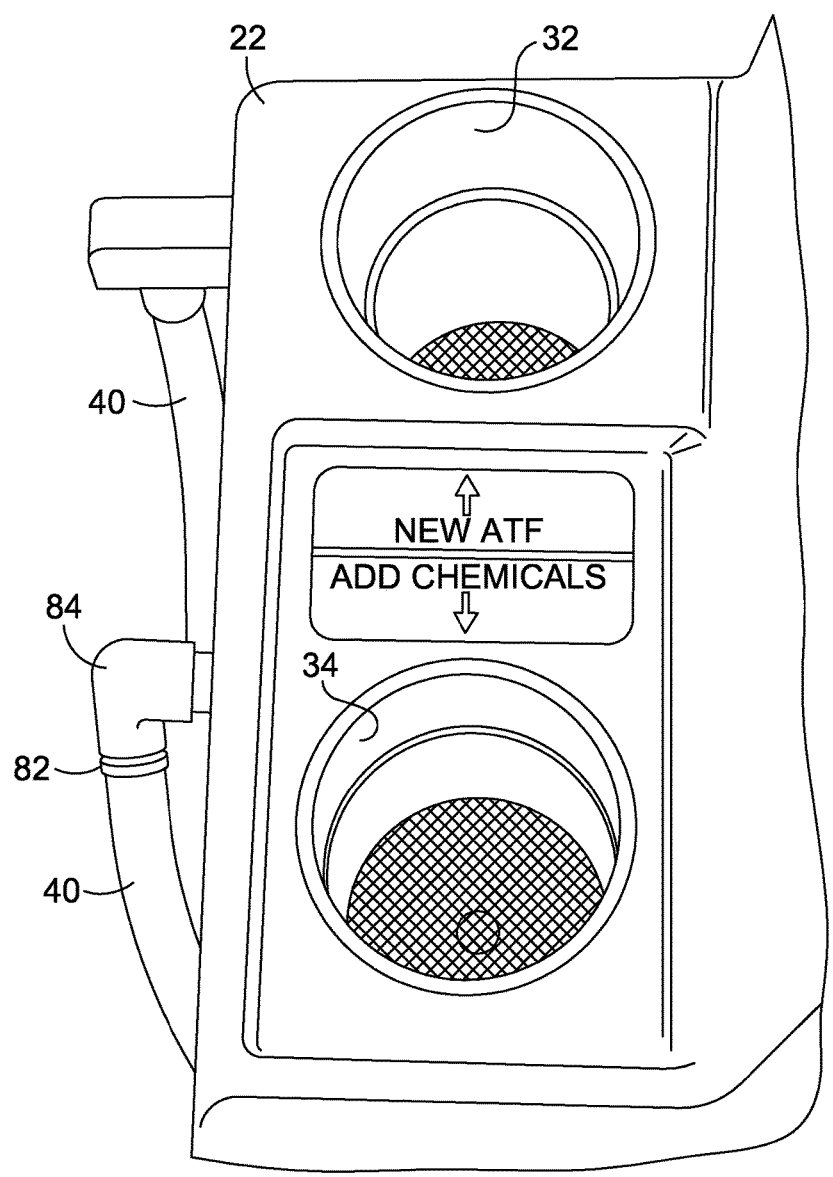
FIG. 9 is an enlarged fragmentary view of a portion of the machine of FIG. 1 illustrating an area with funnels for adding various fluids to the machine.

FIG. 9 is an almost top plan view of the two funnels 32, 34 on the upper surface 80 of the housing 22 where an operator may add new ATF or may add chemicals to the fluid, such as cleaner and/or conditioner during the process, which will be discussed below.

Turning now to FIGS. 10-15, flow diagrams are provided to illustrate the flow of fluid through the machine 10 during various operations of the machine 10. The flow diagram illustrates the ball valve 118 that is operated by the valve control level 30 on the upper surface 80 of the housing 22, the used fluid manifold 104, the new fluid manifold 102, the used fluid pump 46 associated with the used fluid manifold 104, and the new fluid pump 48 associated with the new fluid manifold 102. The solenoid valve 100 is coupled with the used fluid manifold 104 and electronically changes the flow of fluid through the used fluid manifold 104 to either direct the fluid out of the used fluid manifold 104 towards the used fluid pump 46 and ultimately, after passing through a strainer 120, into the used ATF tank 18 in the exchange mode or to the vehicle 16 by exiting out a hose 122 which flows to the new fluid manifold 102 in the bypass mode. The new fluid manifold includes four floating balls 124, 125, 127, 129 that direct the flow of fluid through the new fluid manifold 102 based on their location, which is dependent on the direction fluid is flowing through the new fluid manifold 102. In other words, the new fluid manifold 102 does not include electronically operated valves, like the solenoid valve 100. Instead, the direction fluid is flowing through the new fluid manifold 102 causes the balls to move in different orientations to direct the flow of fluid there through.

Both of the pumps 46, 48 in the machine 10 are reversible. This not only allows the machine 10 to pump fluid into their associated tanks 18, 20, but to withdraw fluid from their tanks 18, 20, as will be discussed below.

Figure 10:
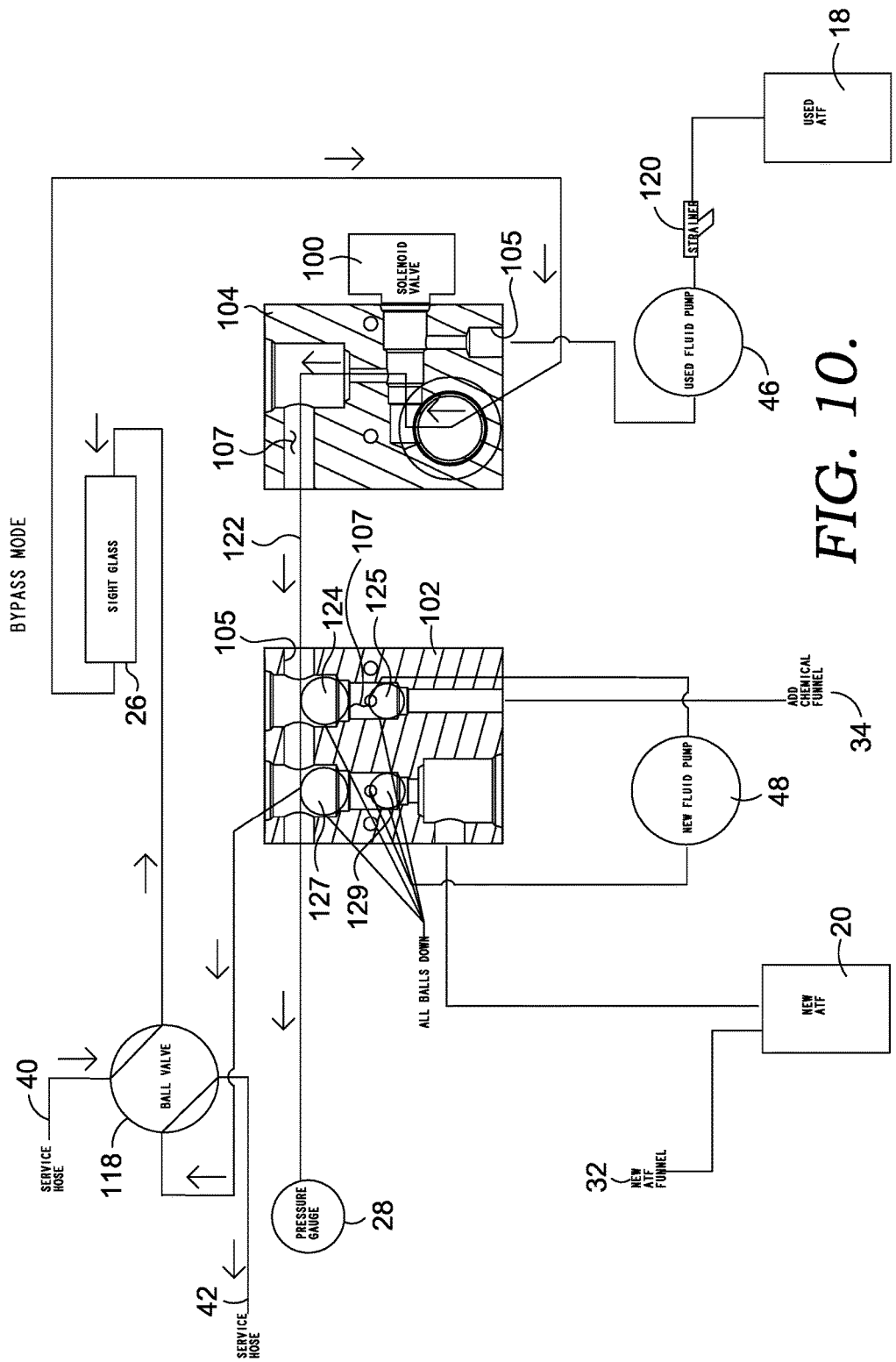
FIG. 10 is a schematic flow diagram illustrating a flow of fluid through the machine of FIG. 1 when in a bypass mode.

FIG. 10 illustrates the flow of fluid through the machine 10 when it is in a bypass mode. In this mode, the machine 10 is not exchanging any fluid from the vehicle 16 but is simply inserted into the fluid flow in the vehicle's system 44 such that whatever the vehicle's pump pumps out of the vehicle 16 through the machine 10 is returned back into the vehicle 16. This mode allows the operator to determine if the machine 10 is connected into the system 44 in the proper orientation. Additionally, it allows the vehicle 16 to operate normally for a period of time, such as when a cleaner has been inserted into the vehicle's system 44 and the cleaner gets circulated through the system 44 to clean the same.

The two service hoses 40, 42 are illustrated in the upper left corner of FIG. 10. Either of the two service hoses 40, 42 may be the in-flow hose where fluid flows into the machine 10, depending on how the hoses 40, 42 are hooked into the system 44. The ball valve 118 may be rotated to connect the in-flow hose 40 to the fluid conduit that leads to the sight glass 26. The fluid flows through the sight glass 26 down into the used fluid manifold 104, through the solenoid valve 100 and out of the used fluid manifold 104 to the new fluid manifold 102. With all four balls 124, 125, 127, 129 being in the down position, the fluid flows out of the new fluid manifold 102 through the ball valve 118 and out the out-flow hose 42 back into the vehicle's transmission system 44. The pressure is read by the pressure gauge 28 and displayed to the operator. It should be noted that for ease of illustration and conception, the service hoses 40, 42 are illustrated as connected directly to the ball valve 118 when, as illustrated in FIG. 6, they actually are connected to the used fluid manifold 104 and then to ball valve 118.

Figure 11:
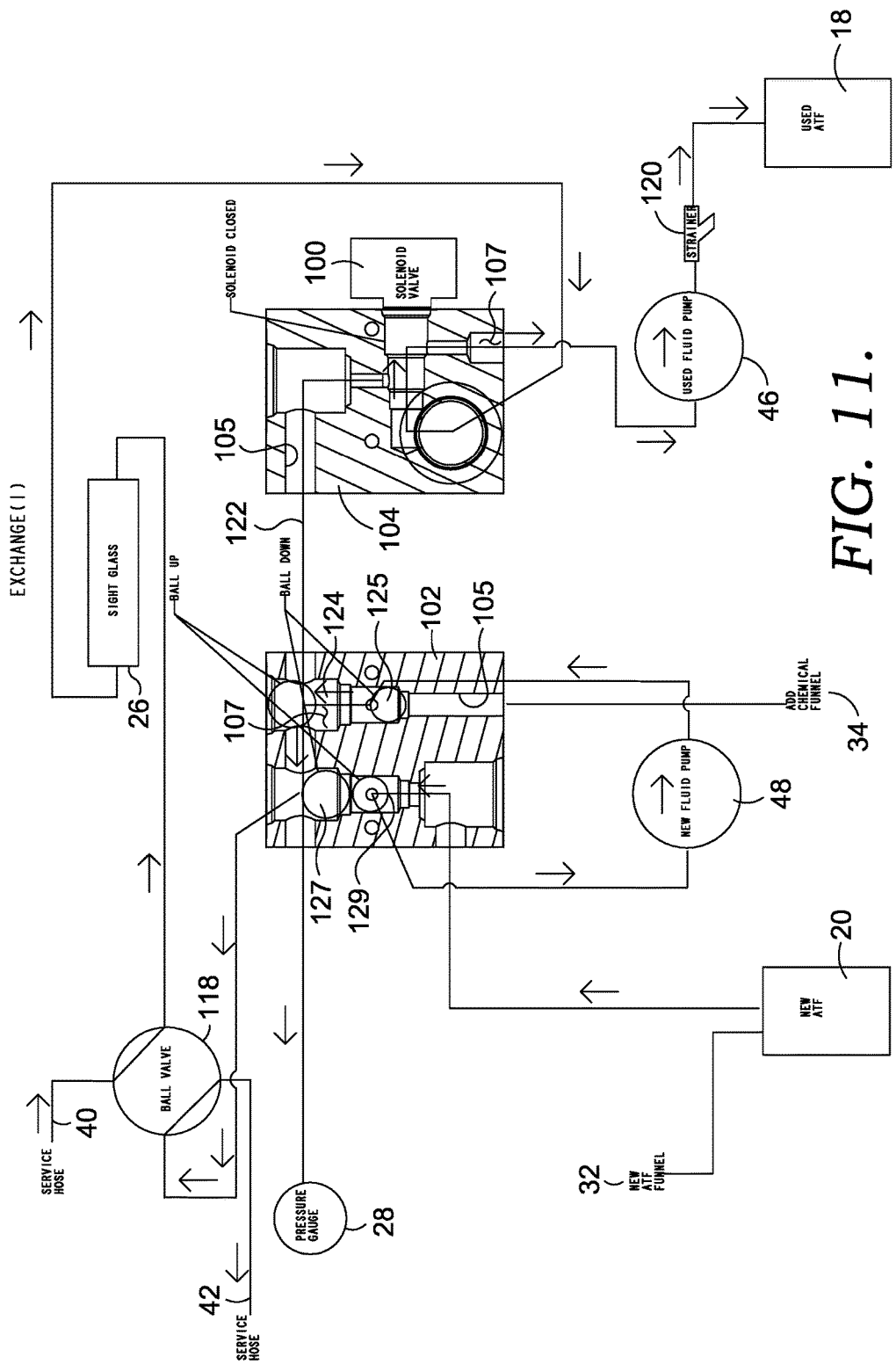
FIG. 11 is a schematic flow diagram illustrating a flow of fluid through the machine of FIG. 1 when in a first exchange mode.
Figure 12:
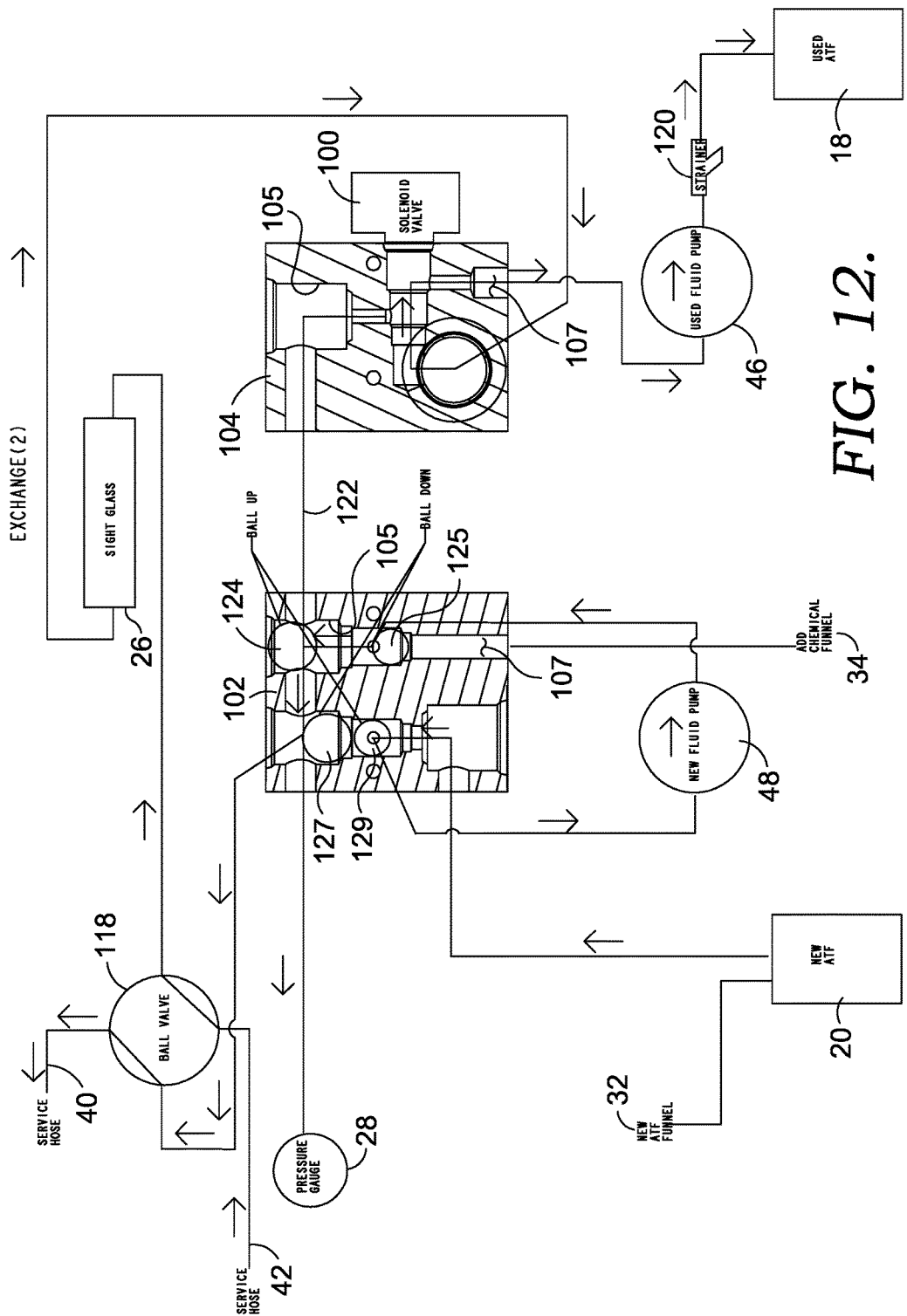
FIG. 12 is a schematic flow diagram illustrating a flow of fluid through the machine of FIG. 1 when in a second exchange mode.

FIGS. 11 and 12 illustrate the machine 10 operating in the exchange mode. FIG. 11 illustrates the top service hose 40 as the in-flow hose, whereas FIG. 12 illustrates the lower service hose 42 as the in-flow hose. When the ball valve 118 is properly oriented, the used fluid flows through the sight glass 26 and down into the used fluid manifold 104. In this mode, however, the solenoid 100 diverts the flow of used fluid out the bottom (in the drawing) of the used fluid manifold 104 down through the used fluid pump 46, through a strainer 120, and out into the used fluid tank 18. In the exchange mode, the used fluid pump 46 preferably assists the vehicle's transmission fluid pump in withdrawing used fluid from the transmission. However, because the vehicle 16 is running during the process and the transmission's fluid pump is operating, new fluid must be replaced at the same volume or level as it is being withdrawn so that the level of transmission fluid in the vehicle's transmission during operation is not decreased or increased, as such could damage the vehicle's transmission. Accordingly, during the exchange operation, the machine's electrical components are monitoring the amount of used fluid removed from the vehicle 10 by weighing the used fluid tank 18.

The weight of the used fluid tank 18 can be used to determine the volume of fluid in the used fluid tank 18 by a simple calculation of weight to known volume. This information is fed through the machine's processor 88 and/or 92 and is used to control the activation of the new fluid pump 48 to withdraw an equal volume of new fluid from the new fluid tank 20. This is measured also by weight and change of weight of the new fluid tank 20. Accordingly, the new fluid motor 98 is variable speed to control the amount of new fluid being removed from the new fluid tank 20 by the new fluid pump 48 depending on the amount of used fluid deposited in the used fluid tank 18. In one embodiment, the used fluid motor 96 is run at a constant speed during the exchange process. In another embodiment, the speed of the motor is variable dependent on the amount of the pressure of the fluid coming out of the vehicle. If the pressure is sufficiently high with only the vehicle's own fluid pump, the used fluid pump 46 may be used very little, if at all. If the fluid pressure is very low, the speed of the used fluid motor 96 may be increased to increase the fluid flow by speeding up the used fluid pump 46 and, in turn, increasing the volume of fluid it is moving.

As illustrated in FIGS. 11 and 12, the new fluid pump 48 is activated to withdraw new fluid from the new fluid tank 20, via one of the fluid pick up tubes 112, which flows from the tank 20 through the new fluid manifold 102, out through the new fluid pump 48, back into the new fluid manifold 102 and out to the vehicle 16 after passing through the ball valve 118. In this orientation, because of the direction of flow of the fluid through the new fluid pump 48, balls 124 and 129 are in an up position while balls 125 and 127 are in a down position. This directs the flow of fluid through the new fluid manifold 102 in the path illustrated.

Figure 13:
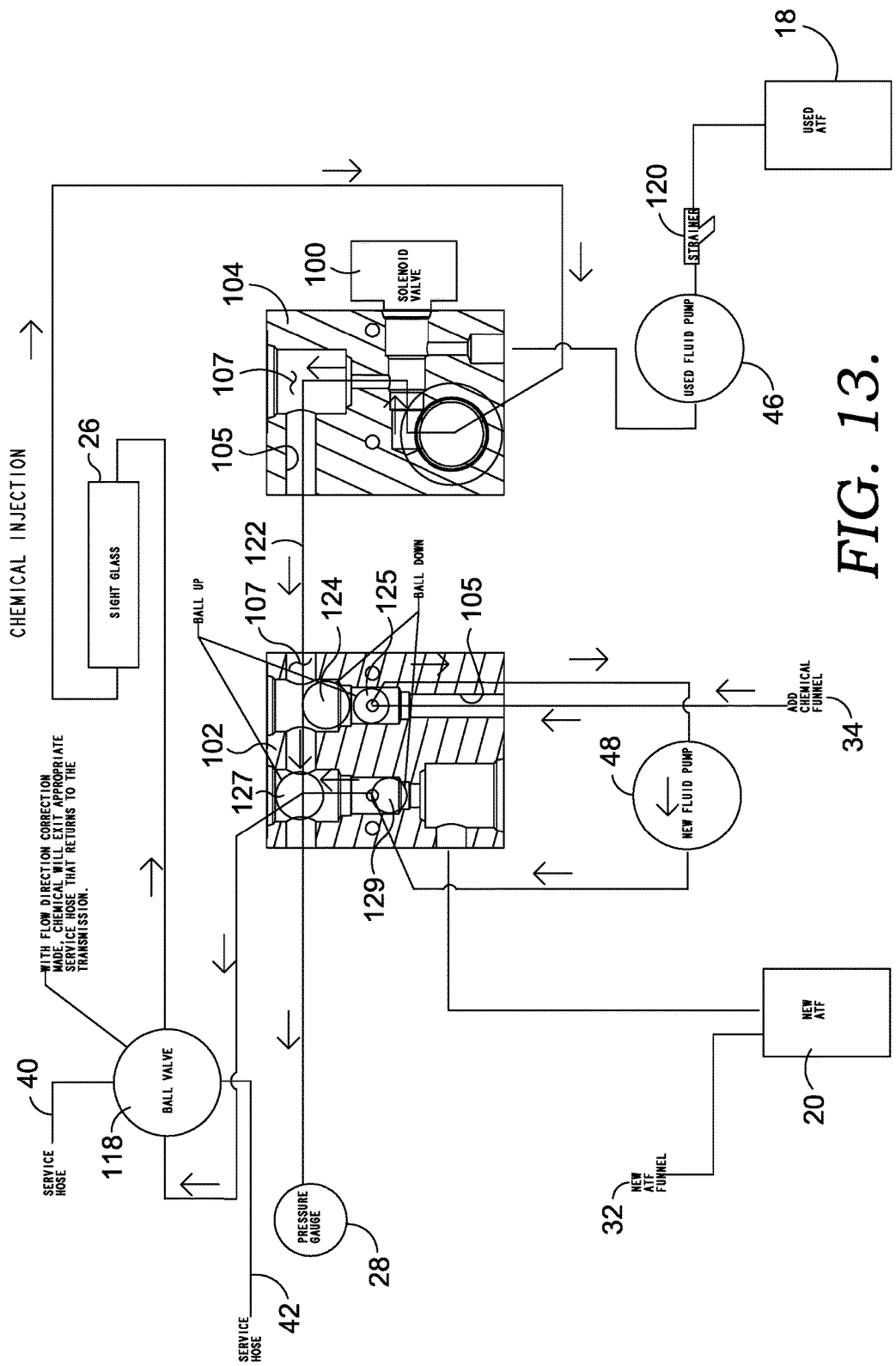
FIG. 13 is a schematic flow diagram illustrating a flow of fluid through the machine of FIG. 1 when in a chemical injection mode.

FIG. 13 illustrates a chemical injection mode. In this mode the machine 10 is operated to introduce a chemical such as a cleaner or a conditioner to the vehicle's system 44. The desired chemical is poured into the chemical funnel 34 on the top of the machine 10 and the new fluid pump 48 is activated to draw the chemical down from the funnel 34, through the new fluid manifold 102, out through the new fluid pump 48 in a direction opposite of the flow during the exchange process, back into the new fluid manifold 102 where it mixes with system 44 fluids, and then out of the new fluid manifold 102 to the vehicle 16 after passing through the ball valve 118. In this mode, the balls in the new fluid manifold 102 are oriented as illustrated to direct the fluid through the new fluid manifold 102 in the desired path. Accordingly, when the new fluid pump 48 is run in a first direction the pump 48 withdraws fluid from the new fluid ATF tank 20. When the pump is operated in an opposite direction, it withdraws fluid from the chemical funnel 34. In both directions, the fluid is forced out of the new fluid manifold 102 towards the ball valve 118 and towards the vehicle 16.

Figure 14:
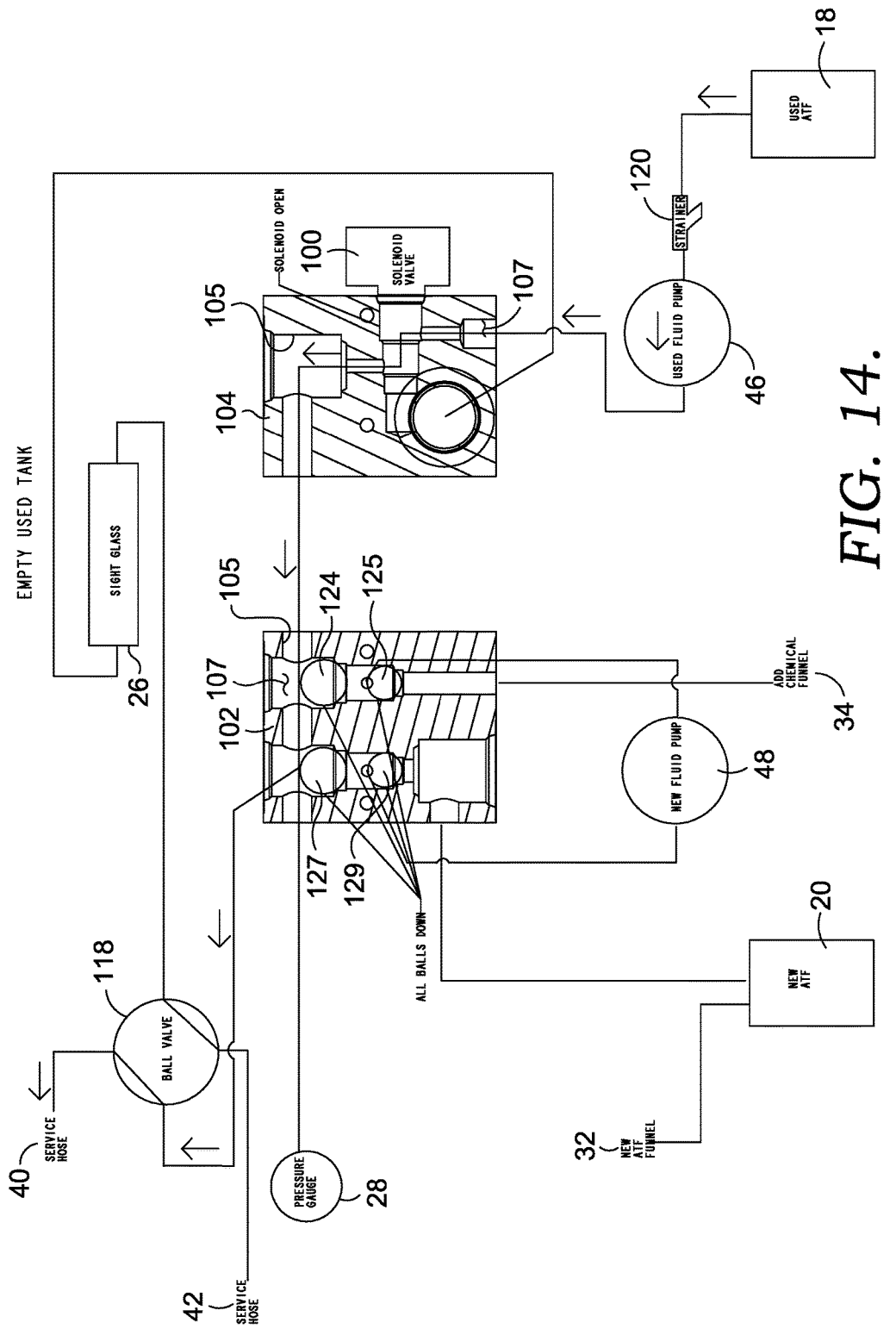
FIG. 14 is a schematic flow diagram illustrating a flow of fluid through the machine of FIG. 1 when in an empty used fluid tank mode.
Figure 15:
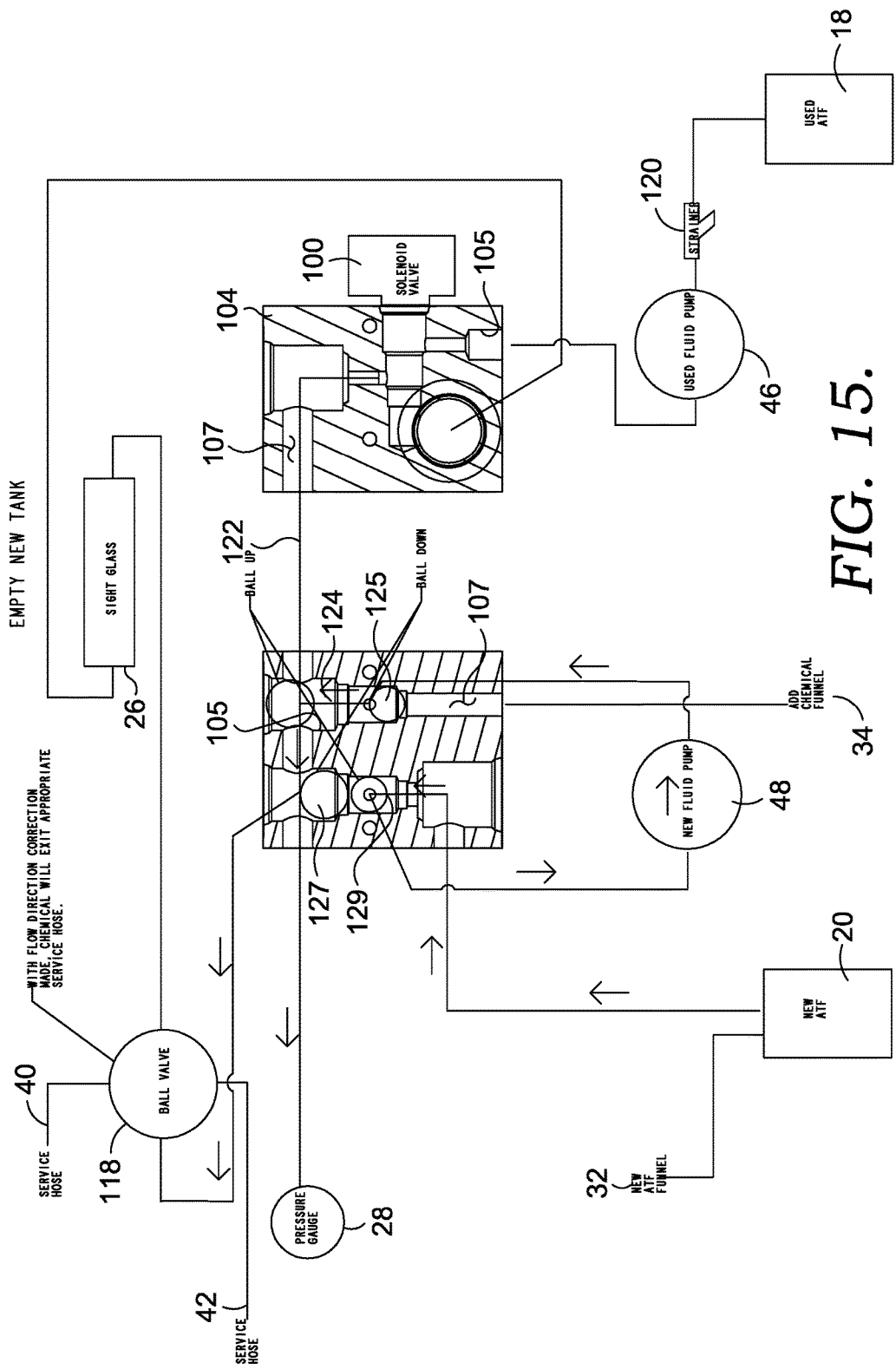
FIG. 15 is a schematic flow diagram illustrating a flow of fluid through the machine of FIG. 1 when in an empty new fluid tank mode.

FIG. 14 illustrates an empty used fluid tank mode where the machine 10 may be operated so as to withdraw used fluid from the used fluid ATF tank 18 and expel it into a suitable collection container (not shown). The used fluid will not be pumped back into a vehicle 16, but would be deposited into a storage container where it can be sent out of the shop for recycling. This is done by connecting the free or distal end 64 of one of the service hoses 40, 42 (as illustrated, hose 40) to a used fluid bulk storage tank. The used fluid pump 46 is then operated in a direction opposite of its operation during the exchange mode. Similarly, FIG. 15 illustrates the machine 10 in a mode where the machine 10 is used to empty the new fluid ATF tank 20. This operation is similar to its flow during the normal fluid exchange process; however, the free end 64 of the service hose 40 or 42 is placed in a receptacle to receive the new ATF fluid. This could be used to change the type of ATF in the tank prior to a service operation.

The display 24 may be a monitor, a video display, a graphic display or the like and is used to direct the service technician or operator through the correct use of the machine 10 during an exchange procedure or service. This is accomplished by presenting the operator with a plurality of screenshots that tell them which steps to take. We will now walk through the operation of the machine 10 as directed by the screenshots in FIGS. 16-47.

Figure 16:
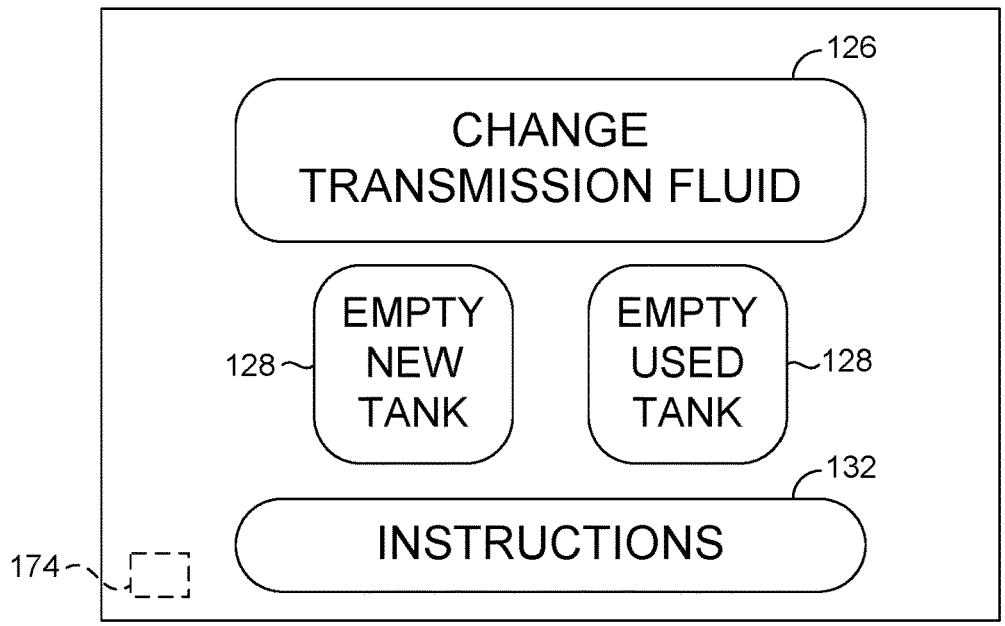

Turning first to FIG. 16, an illustration of an exemplary screen that initially displays on the machine's display 24 at start up (i.e., the Home Screen) is provided. The screen gives the user the options of the programs the machine 10 can run and instructions by way of icons or buttons 126, 128, 130, 132. The display 24 may be a touch screen monitor. Upon the user touching Change Transmission Fluid button 126, the display changes to the illustration in FIG. 17.

Figure 17:
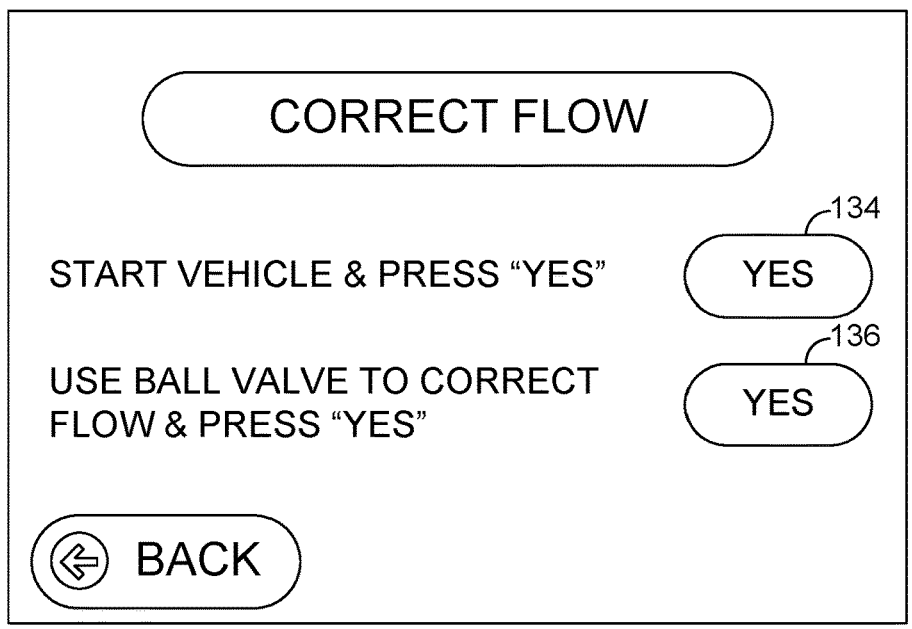

FIG. 17 illustrates a "correct flow" selection screen that informs the operator to start the vehicle 16 and then press a "Yes" button 134. The user then looks at the fluid flow tube 26 to see if fluid is flowing through the machine 10 correctly. If it is, they do nothing to the ball valve 118. If it is not, they rotate it 90° via the valve control lever 30. With fluid flowing correctly through the machine 10, the operator presses a second "Yes" button 136 and a "Next" button (not show)

will appear on the bottom of the screen. When the operator hits the "Next" button, the display changes to the illustration in FIG. 18.

Figure 18:
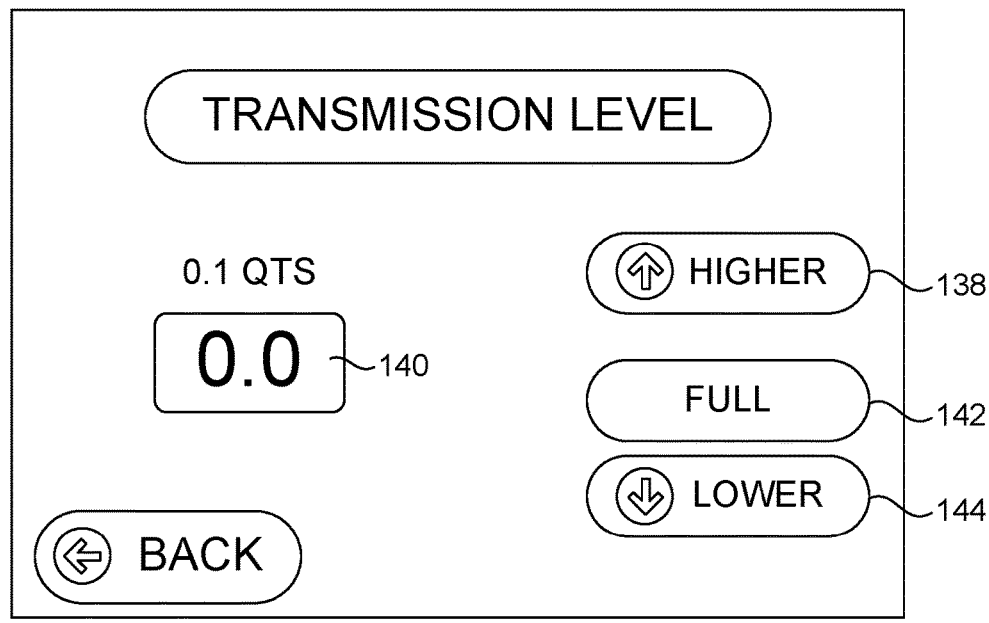

FIG. 18 illustrates a selection screen that pertains to the amount or level of transmission fluid in the vehicle 16. The operator pulls the vehicle's dipstick on the transmission and manually checks the fluid level in the transmission. If it is low and more fluid is needed to be added to get it to full, the operator presses a "Higher" button 138 until the desired amount to add shows in display window 140 (e.g., since the meter here is 0.1 quarts, if the transmission is a half quart low prior to service, the operator would tap the "Higher" button 138 five times to add a half quart). If it's full and it's right where it's supposed to be on the dipstick, then the user presses the "Full" button 142. If the dipstick reading reveals that the transmission is overfull and fluid needs to be removed, the "Lower" button 144 is pressed an appropriate number of times to get to the proper amount to be withdrawn. The machine 10 will store this information and correct accordingly during the exchange mode.

Figure 19:
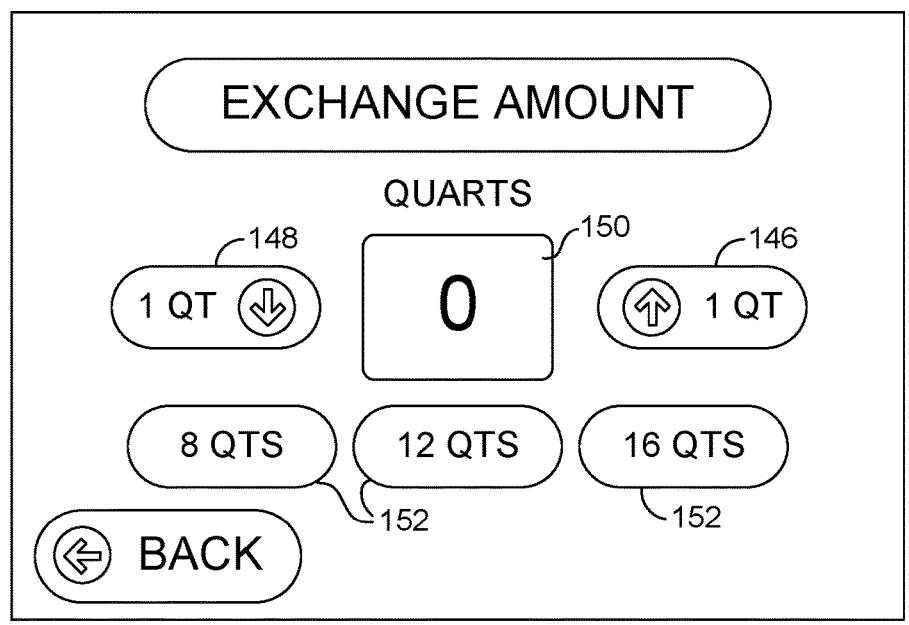

FIG. 19 illustrates a selection screen that permits the user to tell the machine how many quarts to exchange, e.g., 16 quarts. The user may press the up "1 qt" button 146 or down "1 qt" button 148 to raise or lower the amount displayed in window 150. The user could also use any of the pre-selected amount buttons 152 near the bottom of the screen. Upon selection of an amount of fluid to exchange, a "Next" button (not shown) appears and, when pressed, the display changes to the illustration in FIG. 20.

Figure 20:
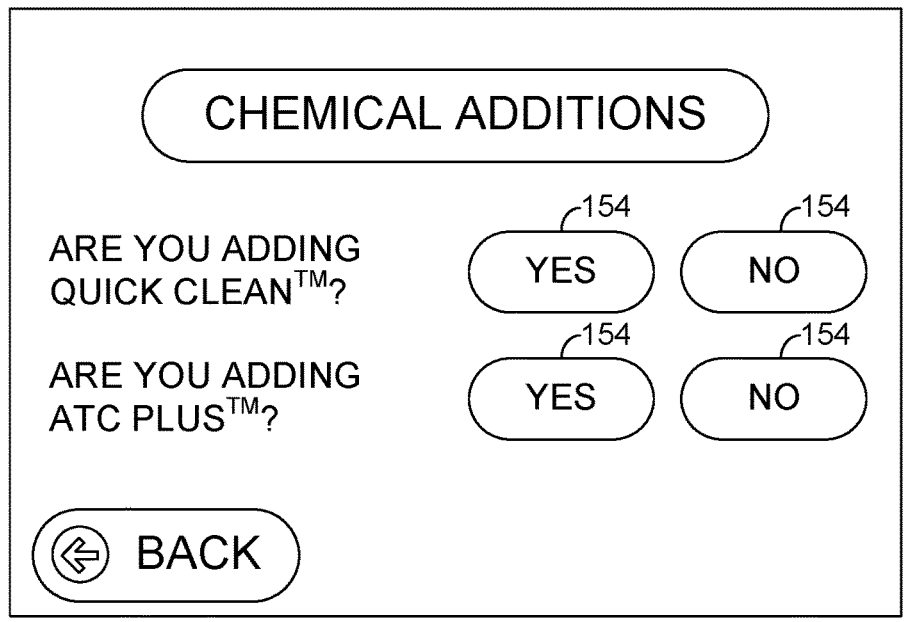

FIG. 20 illustrates a screen that queries the user to determine if any chemicals are going to be added during the process. For example, a transmission system cleaner, such as Quick Clean™ by BG Products, may be added. If adding, the operator presses a "Yes" selection button 154. If not, the operator presses "No" selection button 154. A transmission fluid conditioner, such as ATC Plus™ by BG Products, may also be added or not by selecting the appropriate selection button 154. Once both selections are made, a "Next" button (not shown) appears and, when pressed, the display changes to the illustration in FIG. 21, if the user indicated a cleaner is going to be added, or FIG. 23, if no cleaner is being added. This is because the cleaner does not stay in the vehicle transmission system 44 during normal operation of the vehicle. Instead, a cleaner is simply run through the system 44 in the bypass mode for a predetermined amount of time prior to being removed via the exchange process.

Figure 21:
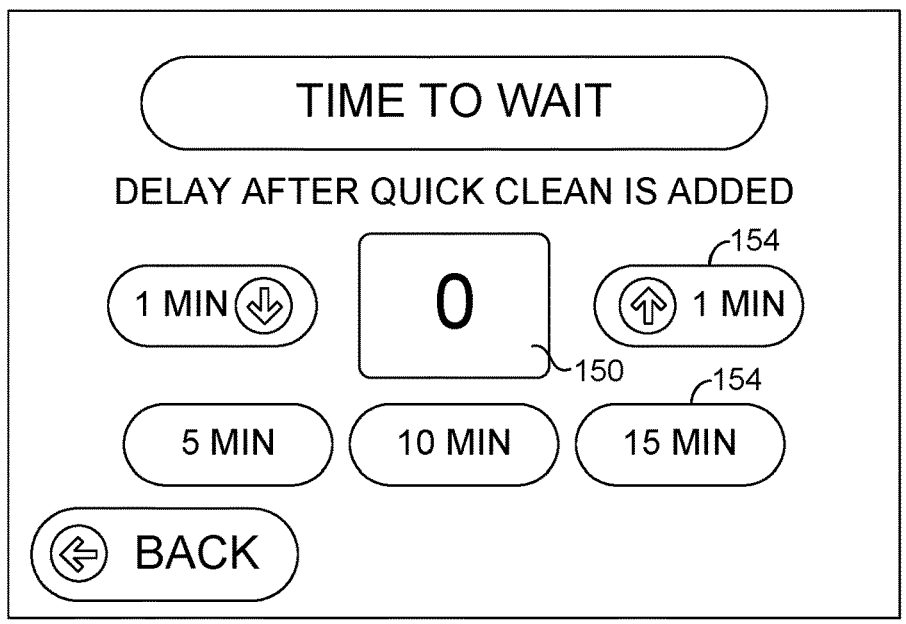

Accordingly, FIG. 21 illustrates a screen that queries the operator to determine how long the operator wants the cleaner to run through the system 44 before starting the exchange process. The operator selects the duration by pressing the appropriate buttons 154, similar to FIG. 19, and presses the "Next" button when the desired duration is displayed in the window 150.

Figure 22:
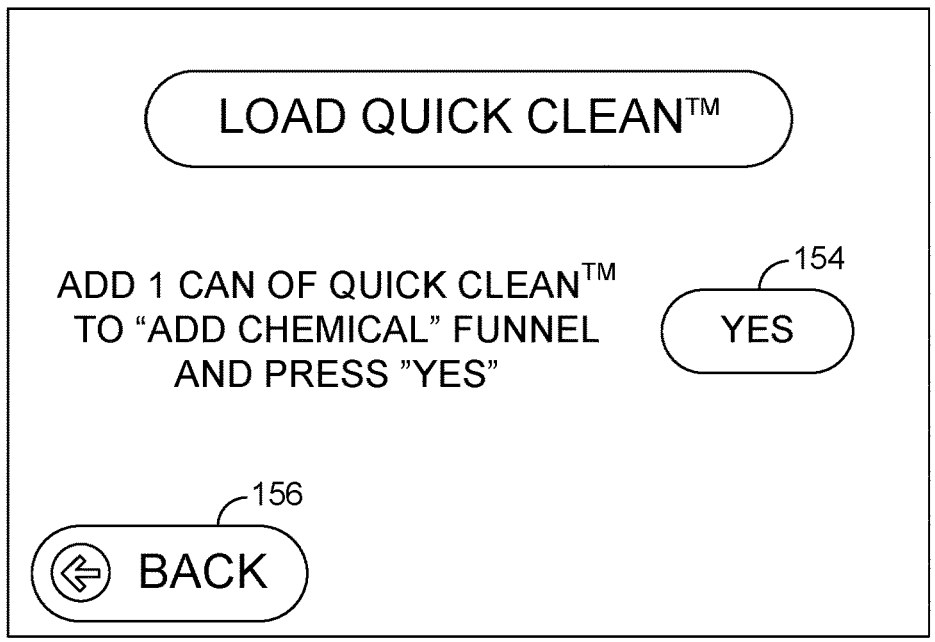
Figure 23:
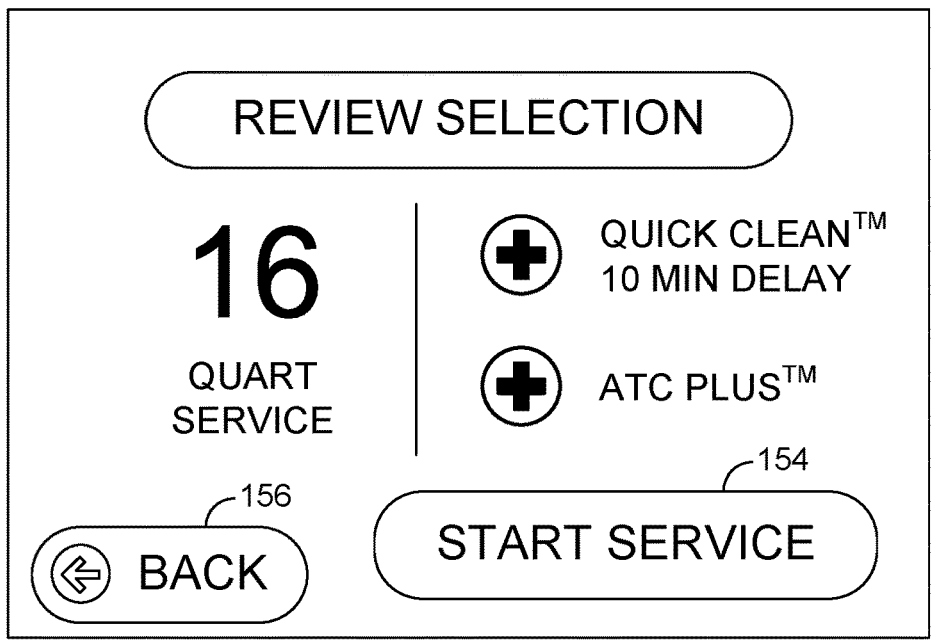

FIG. 22 illustrates a screen that prompts the operator to pour the Quick Clean™ cleaner into the "Add Chemical" funnel 34. After doing so, the operator presses the "Yes" selection button 154 and then the "Next" button. At this point, the machine 10 is still in the bypass mode, so the used ATF is circulating through the vehicle 16 and the machine 10. FIG. 23 illustrates a screen that displays the entire process for review. In the illustrated example, the screen indicates that a 16 quarts exchange will occur after injecting the cleaner and waiting for 10 minutes to allow the cleaner to be circulated through the system and that a conditioner will be added after the exchange. If all of the information is correct, the user presses the "Start Service" selection button 154. If something is not correct, the user presses the "Back" button 156 to go back as many screens as necessary and make the desired changes.

After pressing the "Start Service" selection button 154, a screen similar to that illustrated in FIG. 24 is displayed, which indicates that the machine 10 is adjusting the fluid level in the vehicle's transmission before starting the exchange process to ensure a proper service occurs. This action takes into account the amount the user previously requested the fluid level to be changed to bring it to full and the amount of cleaner to be used. The machine 10 then switches to the chemical injection mode and displays a screen similar to that illustrated in FIG. 25. As discussed above, in the chemical injection mode the new fluid pump 48 is operated to draw the cleaner out of the funnel 34, down into the pump 48 and then out into the vehicle 16. The process screen of FIG. 25 conveys the amount of time remaining for this step. While the pump 48 is programmed to run for a predetermined amount of time to complete the chemical injection mode step, if the operator sees that all of the chemical is gone from the funnel 34, the operator my press the "Funnel Is Empty" button 158 to cause the pump 48 to stop and the completion of the chemical injection mode step.

Figure 26:
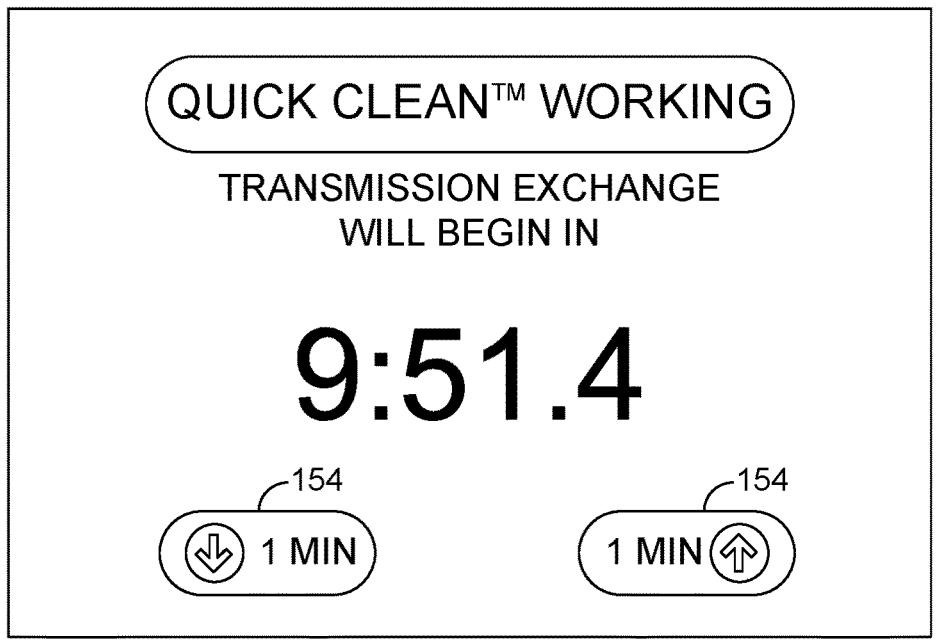

Upon completion of the addition of the cleaner step, the machine 10 displays a process screen similar to FIG. 26 that counts down the duration that the cleaner is circulated through the system in the bypass mode. The operator may manually increase or decrease the duration at this point by using the selection buttons 154 along the bottom of the screen.

Figure 27:
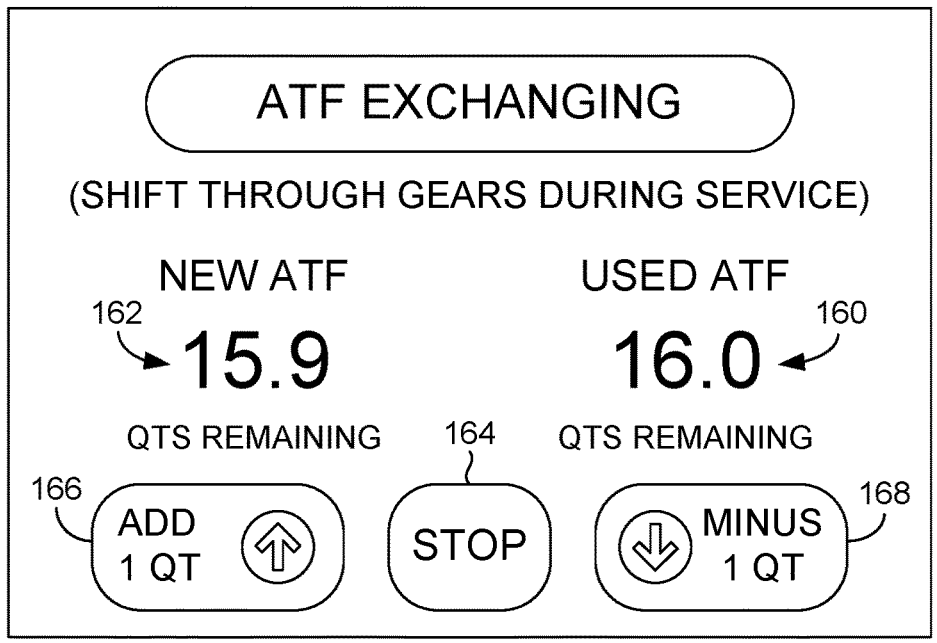

Upon completion of the cleaning cycle step, the machine 10 displays a process screen similar to FIG. 27 and the ATF exchange service step begins. As used ATF is removed, a USED ATF countdown counter 160 is displayed that illustrates the quarts remaining to be exchanged. Similarly, as new fluid is added, a NEW ATF countdown counter displays the amount of new fluid left to be introduced into the system 44. The ATF Exchanging screen also includes a "Stop" button 164, that allows the operator to stop the exchange step should it be necessary, an "Add 1 Qt." button 166, and a "Minus 1 Qt." button 168, to allow the operator to increase or decrease the amount of fluid to be exchanged.

Figure 28:
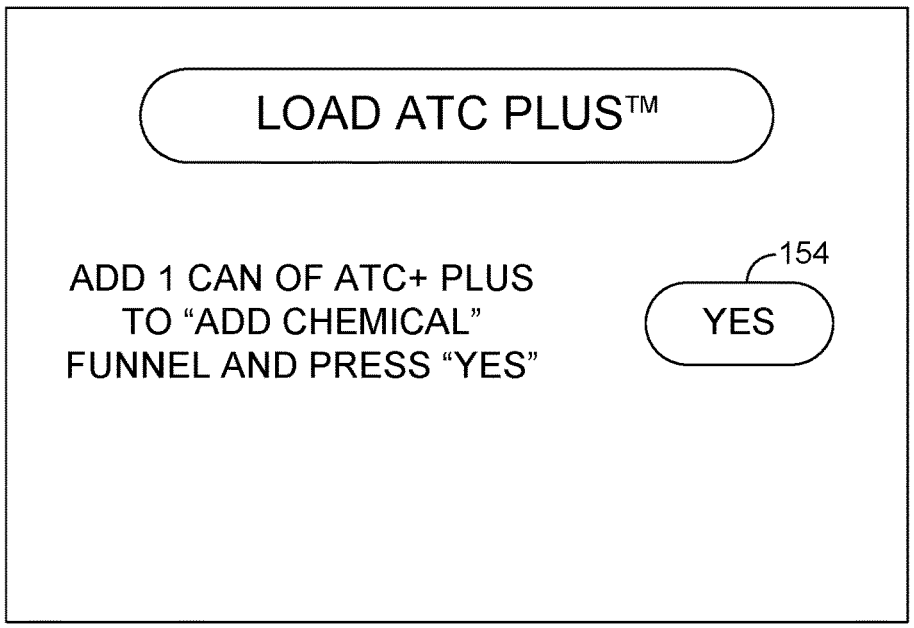
Figure 29:
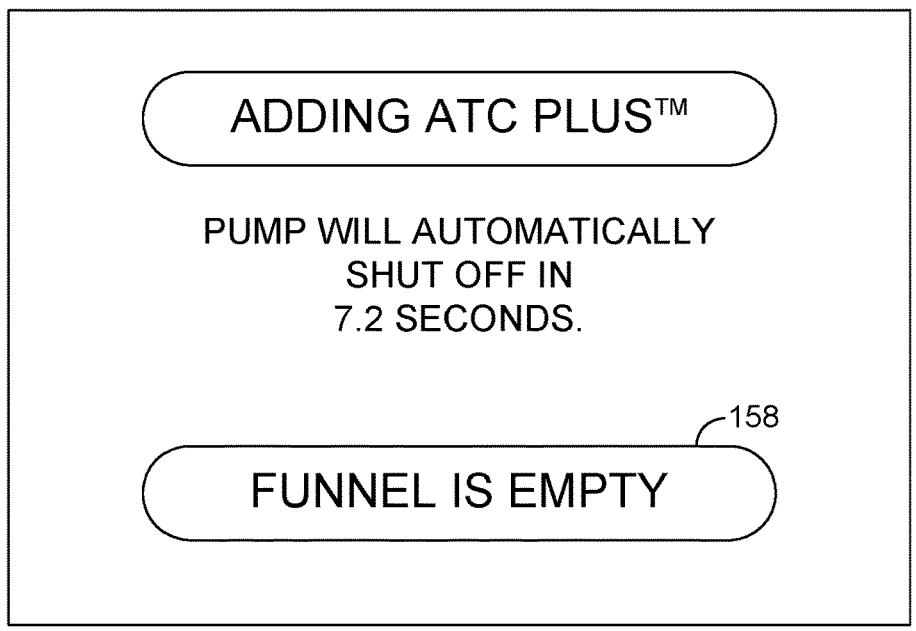
Figure 30:
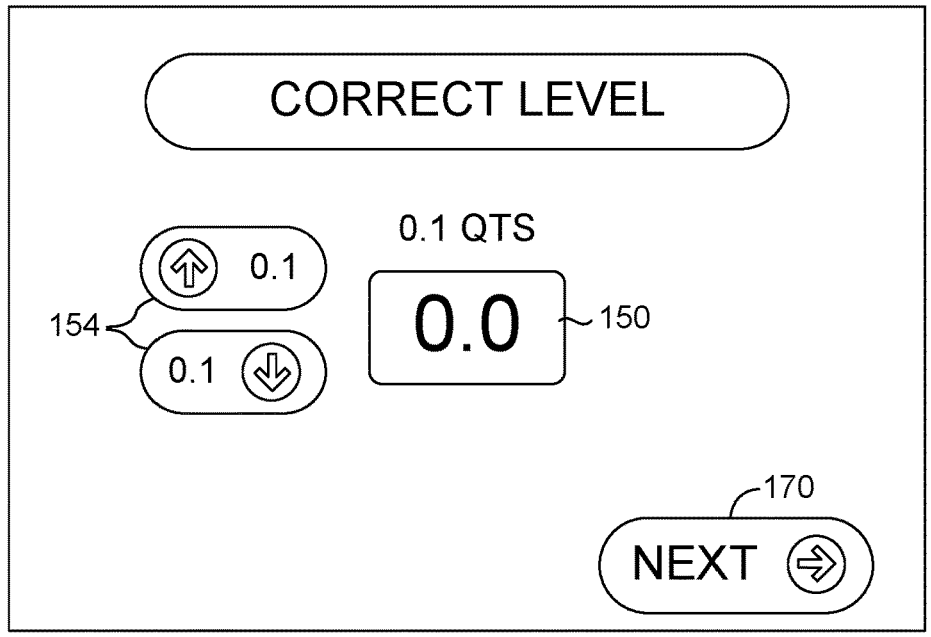

Once the exchange process is completed, the machine 10 switches back to the bypass mode and the machine 10 displays a process screen similar to FIG. 28. The user is prompted to pour the conditioner into the Add Chemical funnel 34. After doing so, they press the "Yes" selection button 154 and then a "Next" button appears that, when pressed, causes the display 24 to change to a process screen similar to FIG. 29. FIG. 29 illustrates an adding conditioner step. The display 24 informs the operator that the chemical is being drawn out of the funnel 34 by the pump 48 and inserted into the vehicle's system 44 and how much time is remaining for this step. If the funnel 34 is empty before the time allotted for the pump 34 to withdraw the fluid from the funnel 34, the operator may conclude the step by pressing the "Funnel Is Empty" button 158. The machine 10 accommodates for the volume of the conditioner being added by removing an equal amount of ATF from the vehicle's system 44.

After the conditioner is inserted, the chemical injection mode stops and the bypass mode resumes. The display then shows a process screen similar to FIG. 30 that prompts the operator to manually check the vehicle's transmission fluid level again. If the dipstick indicates a high or low fluid level, the operator informs the machine 10 how much to take out or add by way of the selection buttons 154 and then presses the "Next" button 170. The machine 10 then either removes or adds the correct amount of ATF or does nothing if at the proper level.

Figure 31:
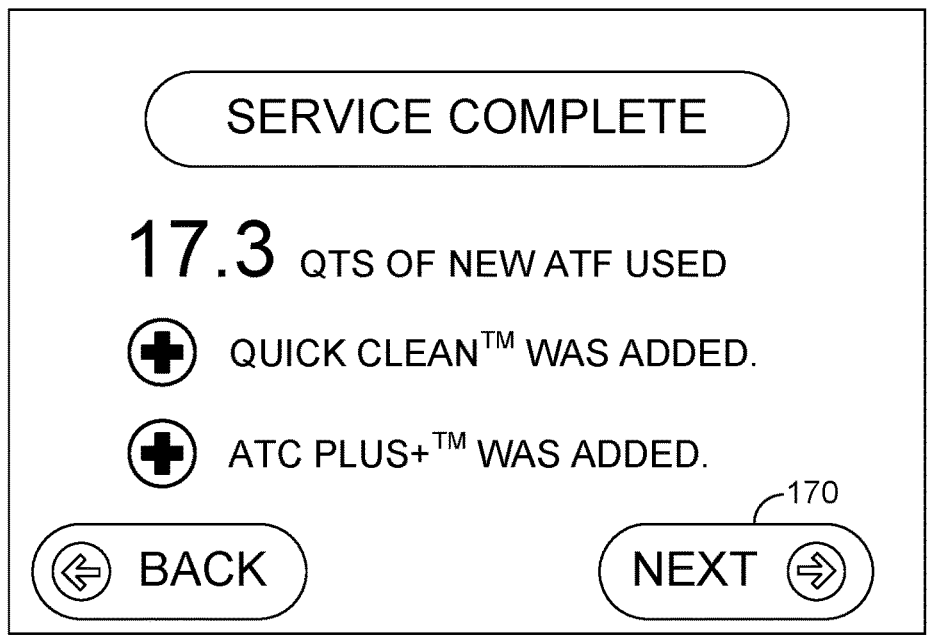
Figure 32:
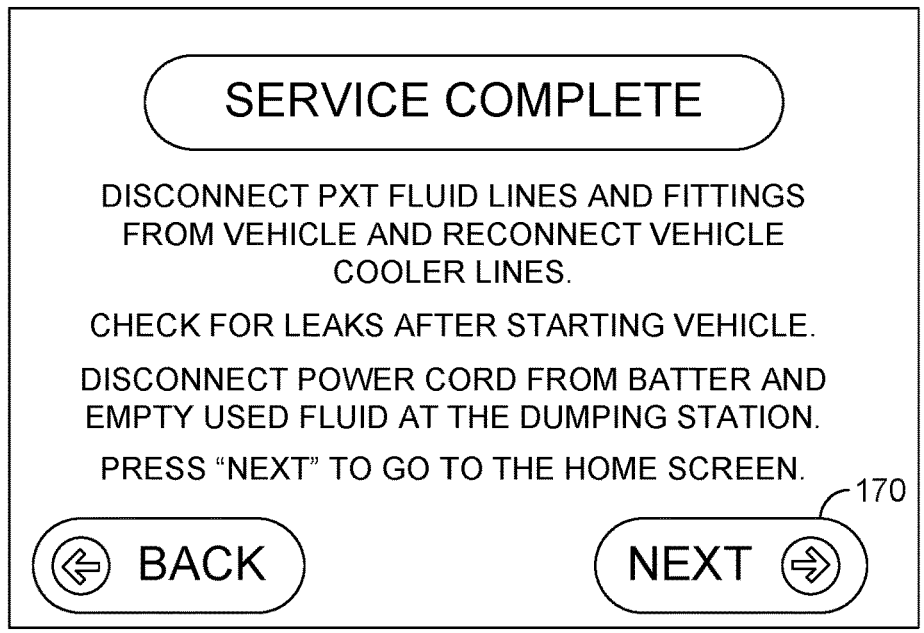
Figure 33:
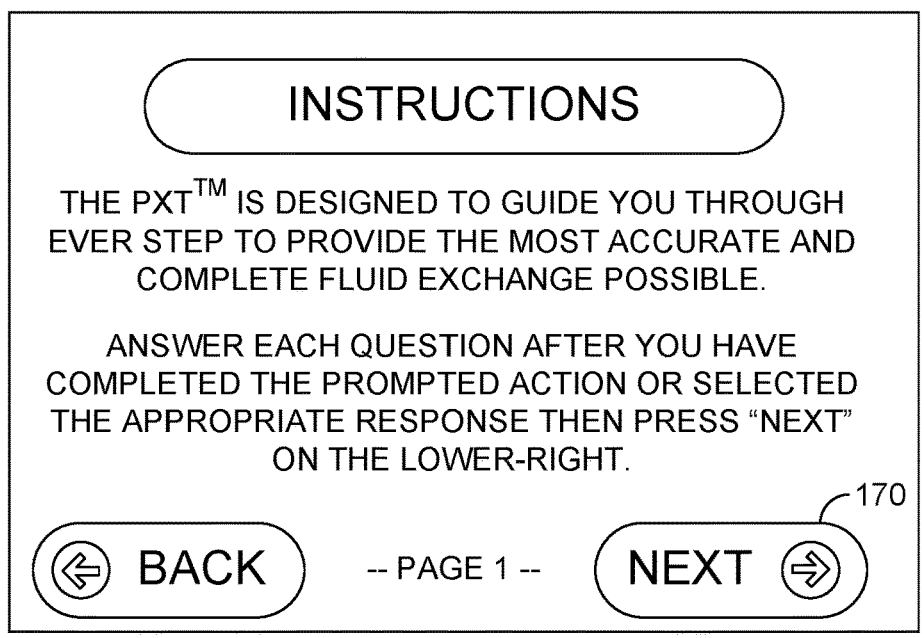
Figure 34:
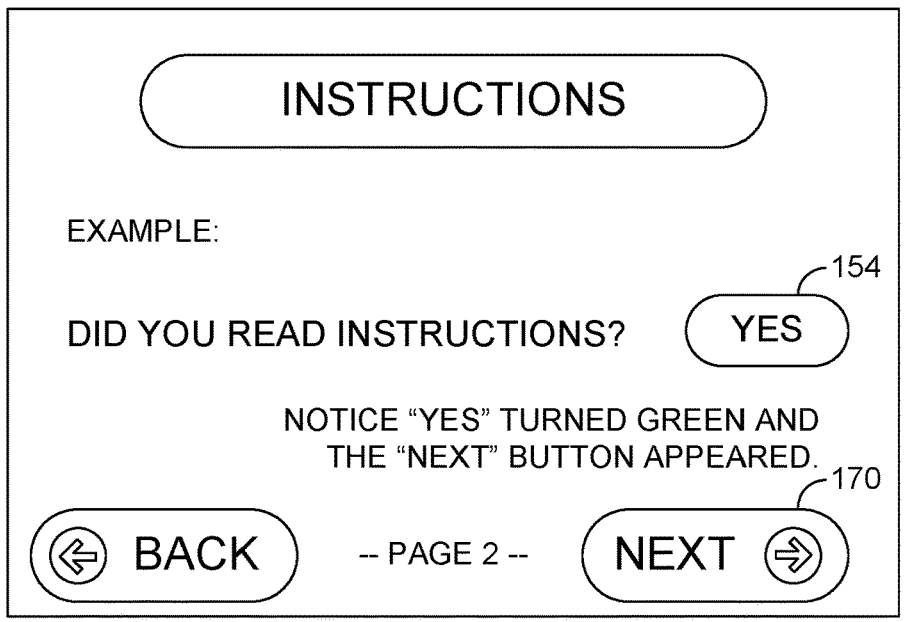
Figure 35:
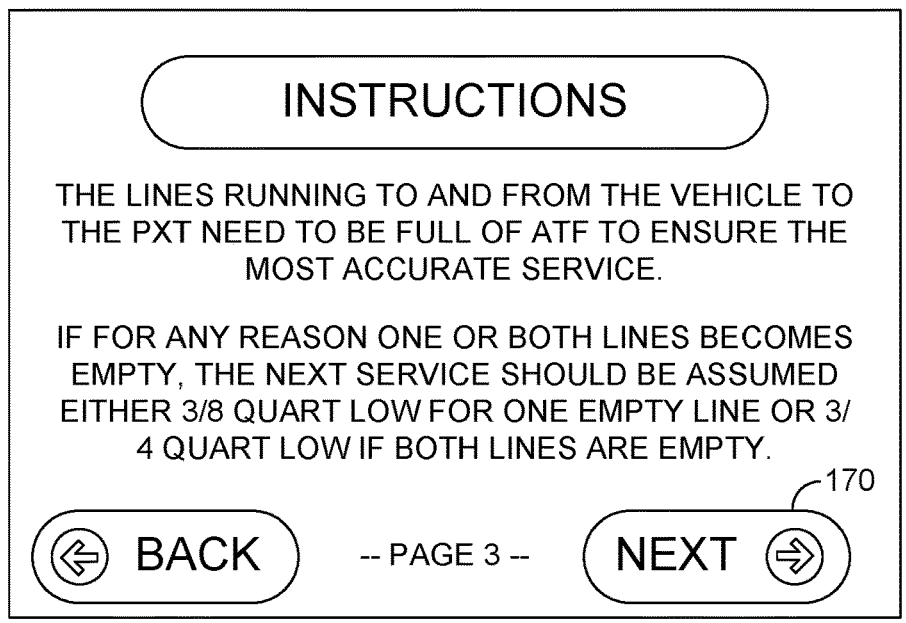

FIG. 31 illustrates an overview screen that informs the operator of the processes that were performed. In this case Quick Clean™ cleaner and ATC Plus™ conditioner were added and 17.3 quarts of new fluid were used. The operator presses the "Next" button 170 and a second Service Complete screen, FIG. 32, informs the operator the service is completed, that they need to shut the vehicle 16 off, remove the hoses 40, 42, check for leaks, and disconnect the power cord 52 from the vehicle 16. Pressing the "Next" button 170 returns the display 24 to the Home Screen, illustrated in FIG. 16.

On the Home Screen, FIG. 16, the user may select the "Instructions" button 132. Selecting this button 132 causes the display 24 to display a first Instructions screen, illustrated in FIG. 33. The Instruction screens, illustrated in FIGS. 33-37 walk users/operators through a set of basic instructions on what the buttons do and how to operate the machine 10.

Figure 38:
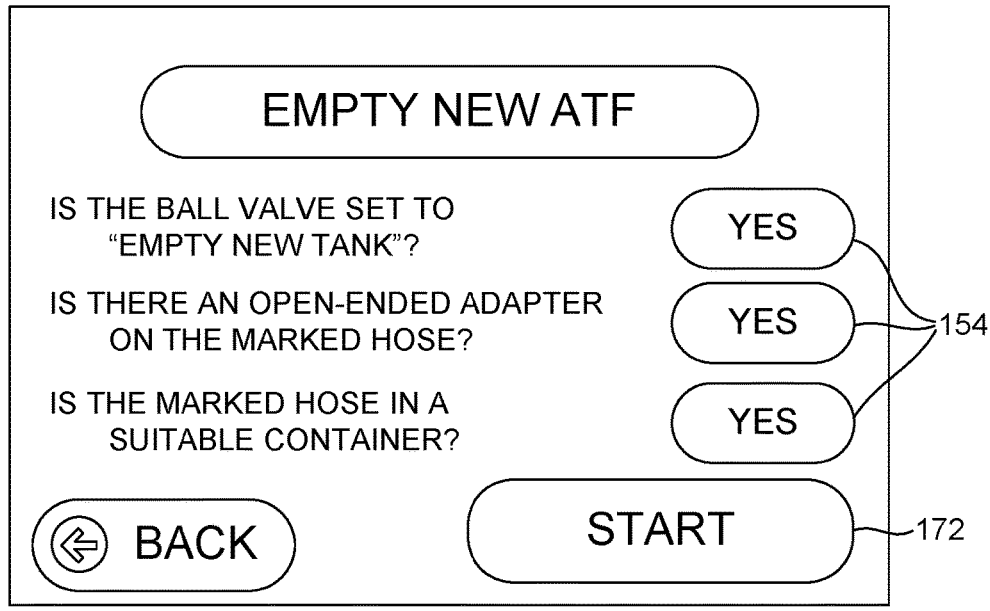
Figure 39:
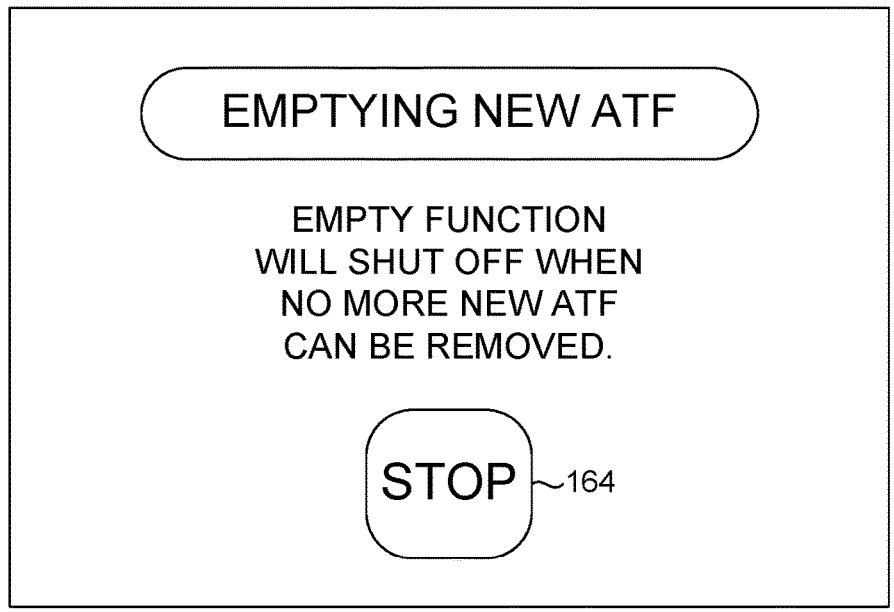
Figure 40:
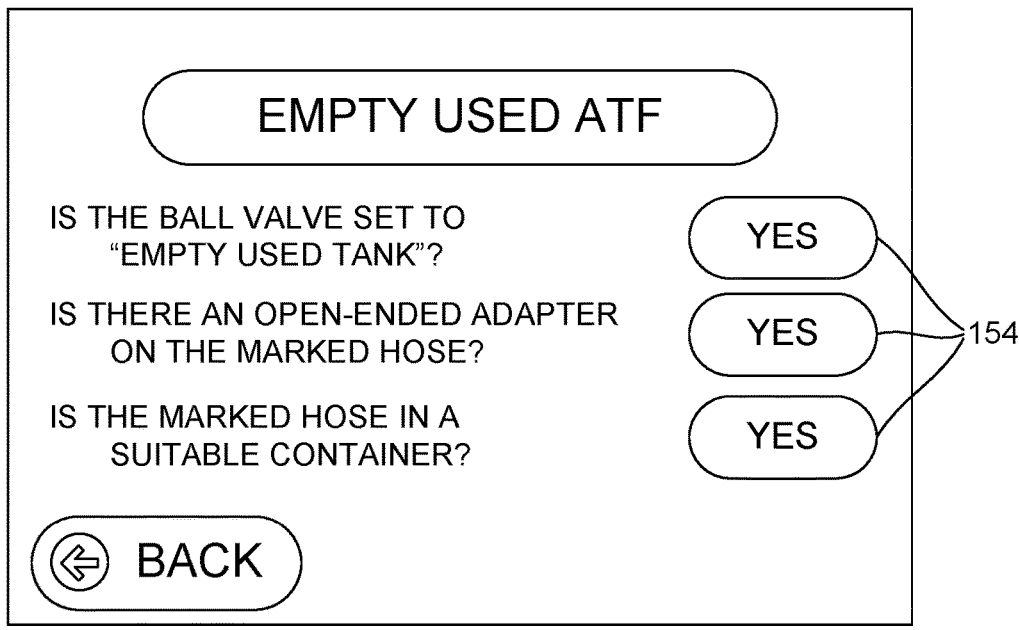
Figure 41:
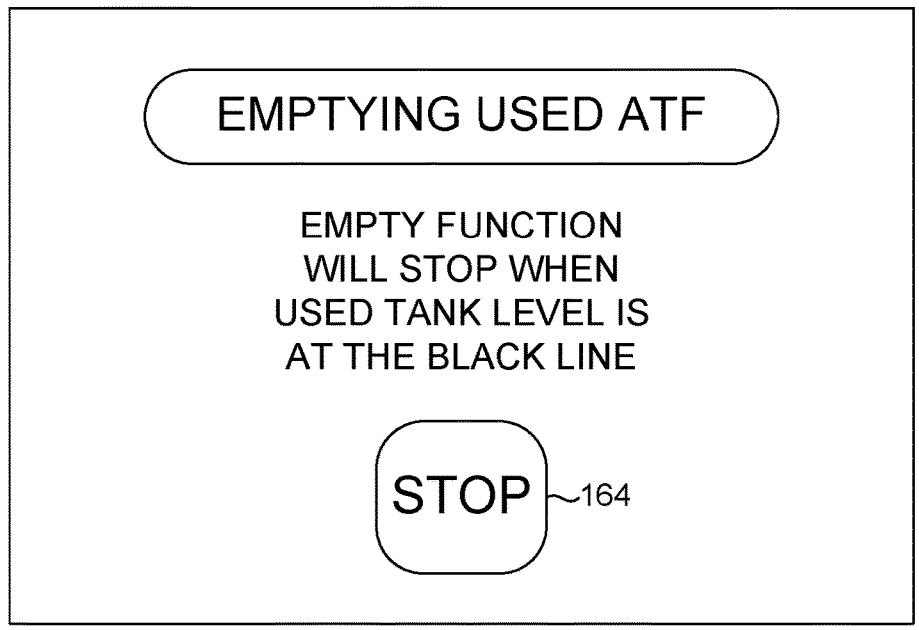

On the Home Screen, FIG. 16, pressing the "Empty New Tank" button 128 causes the display 24 to display an Empty New ATF screen, illustrated in FIG. 38. The screen displays a number of prompts that the user replies affirmatively to after completing any necessary tasks by pressing each of the "Yes" selection buttons 154. After all questions are answered in the affirmative, a "Start" button 172 appears. When pressed, the display 24 illustrates an Emptying New ATF screen, illustrated in FIG. 39, and the machine 10 begins emptying the New ATF tank 20 by activating the pump 48, in the manner discussed above. The emptying function will shut off when manually terminated by the user pressing the "Stop" button 164 or at a certain level. To keep the lines full, the machine preferably does not empty all the fluid out of either tank 18, 20, but leaves a small amount in the bottom of the tank 18, 20. That keeps the weight scales 60, 62 leveled out and it causes the machine 10 to never run dry. The hoses 40, 42 are preferably kept full all the time as well so they are ready to go and the user doesn't have to waste about ¾ths of a quart of ATF each time the machine 10 is used. Pressing the "Empty Used Tank" button 130 displays screens illustrated in FIGS. 40-41 and the machine 10 to remove the used ATF from the used fluid tank 18 as discussed above and in a process similar to that described in relation to FIGS. 38 and 39.

Figure 42:
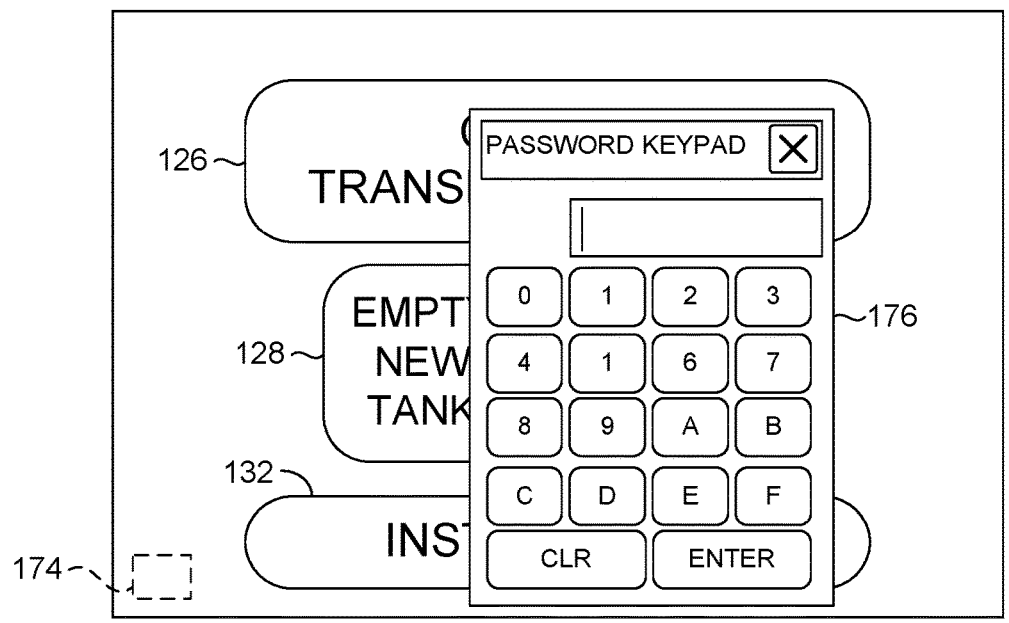
Figure 43:
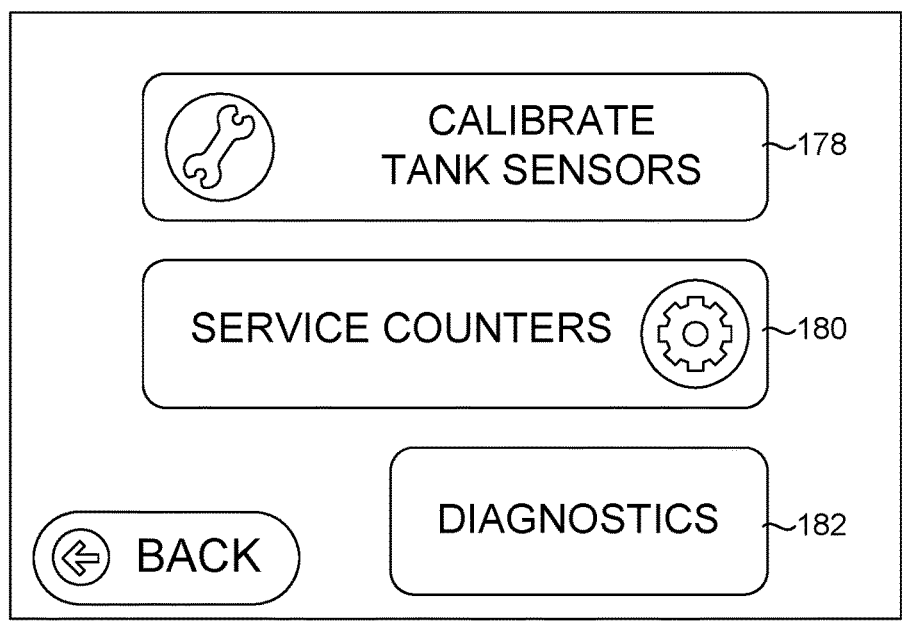

Returning to the Home Screen, illustrated in FIG. 16, a service the machine 10 option is available. An invisible button 174 is located on the Home Screen in the bottom left-hand corner. Pressing there brings up a Password Keypad 176, as shown in FIG. 42. After entering the password, the main service screen, illustrated in FIG. 43, appears. The service screen is mainly for distributor salesmen or a person that works on the machine 10. This provides for fixing the machine 10 if something's gone wrong and is not something service technicians need to have access to. Options on the service home screen are Calibrate Tank Sensors 178, Service Counters 180, and Diagnostics 182.

Figure 44:
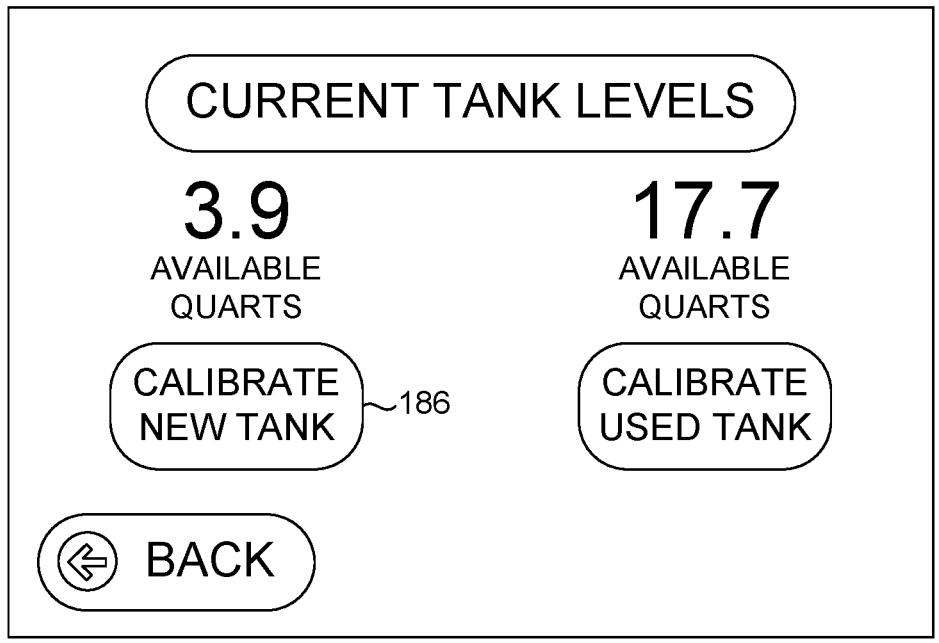
Figure 45:
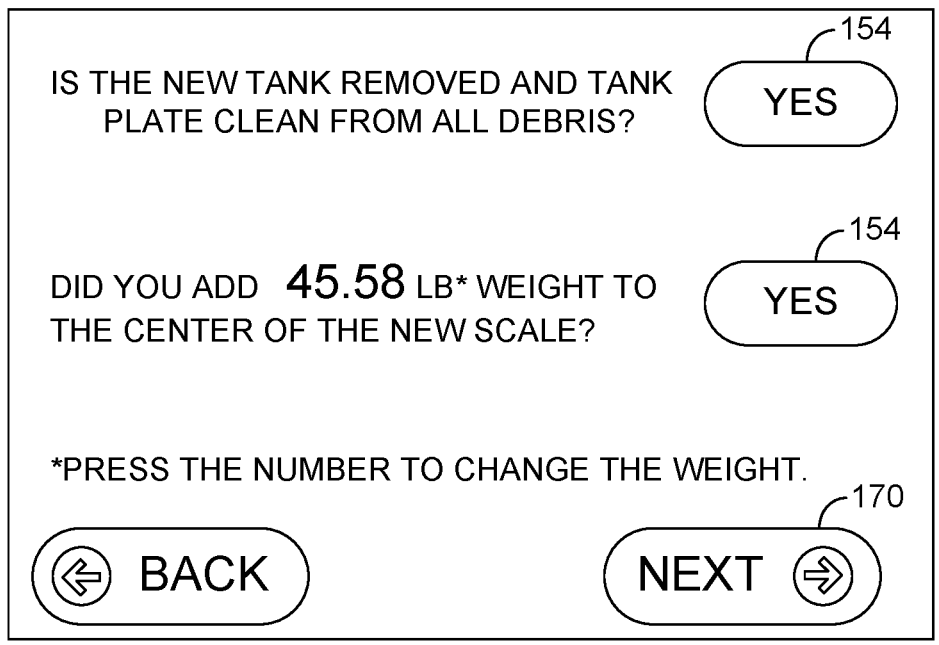

Pressing the Calibrate Tank Sensors button 178 displays a process screen, illustrated in FIG. 44, that allows the user to recalibrate the weight scales 60, 62 for the new tank 20 and/or the used tank 18, if needed. The display 24 shows the amount the machine 10 believes is present in each tank 18, 20. The user visually inspects the tanks 18, 20 and determines if the actual volume as measured by the scale markings 184 on the sides of the tanks 18, 20 match the digitally displayed amount. If the amounts do not correspond, the user can recalibrate the amounts. Pressing the Calibrate New Tank button 186 results in the display of a calibrate tank sensor screen, illustrated in FIG. 45.

Here, after cleaning the new fluid scale 60, a user puts a weight of a known amount on the new fluid scale 60. That amount is displayed as a number (e.g., 45.58 lbs.). If that amount is accurate, the user presses the "Yes" selection button 154. If it is not, the user presses the number (e.g., 45.58) and is allowed to move the value up or down to the correct amount, then presses the lower "Yes" selection button 154, at which time the scale 60 is recalibrated. Pressing the "Next" button 170 returns the user to the service home screen illustrated in FIG. 43.

Figure 46:
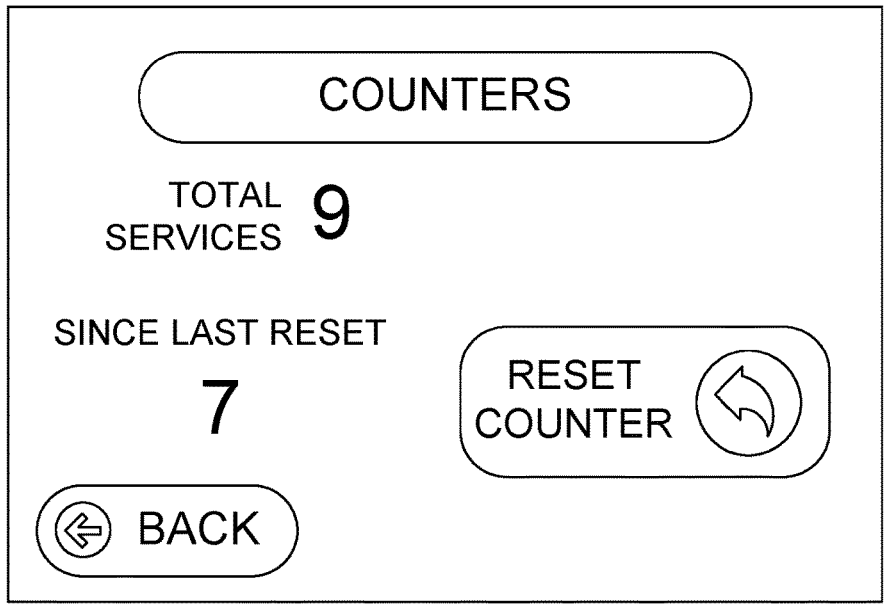

Pressing Service Counters button 180 displays a service counters screen, illustrated in FIG. 46. That screen informs the user how many total services have been performed by the machine 10 and how may since the counter was last reset by pressing the "Reset Counter" button 188.

Figure 47:
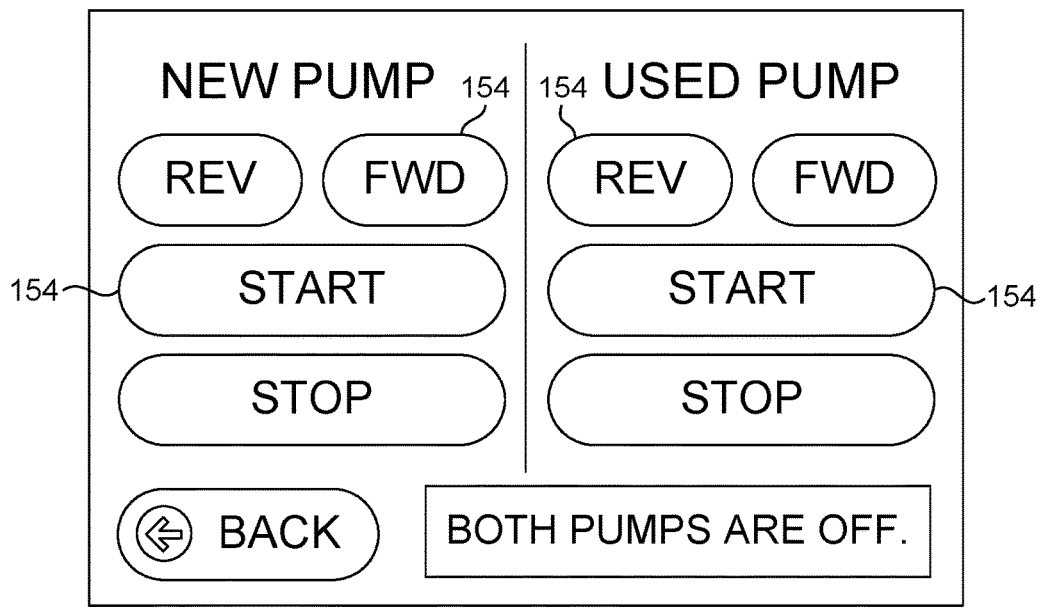

Pressing the Diagnostic button 182 on the service home screen (FIG. 43) displays a diagnostics screen, illustrated in FIG. 47. Here the user can manually run either pump 46, 48 in either direction to assure they are working properly by pressing the desired selection button 154.

Figure 48:
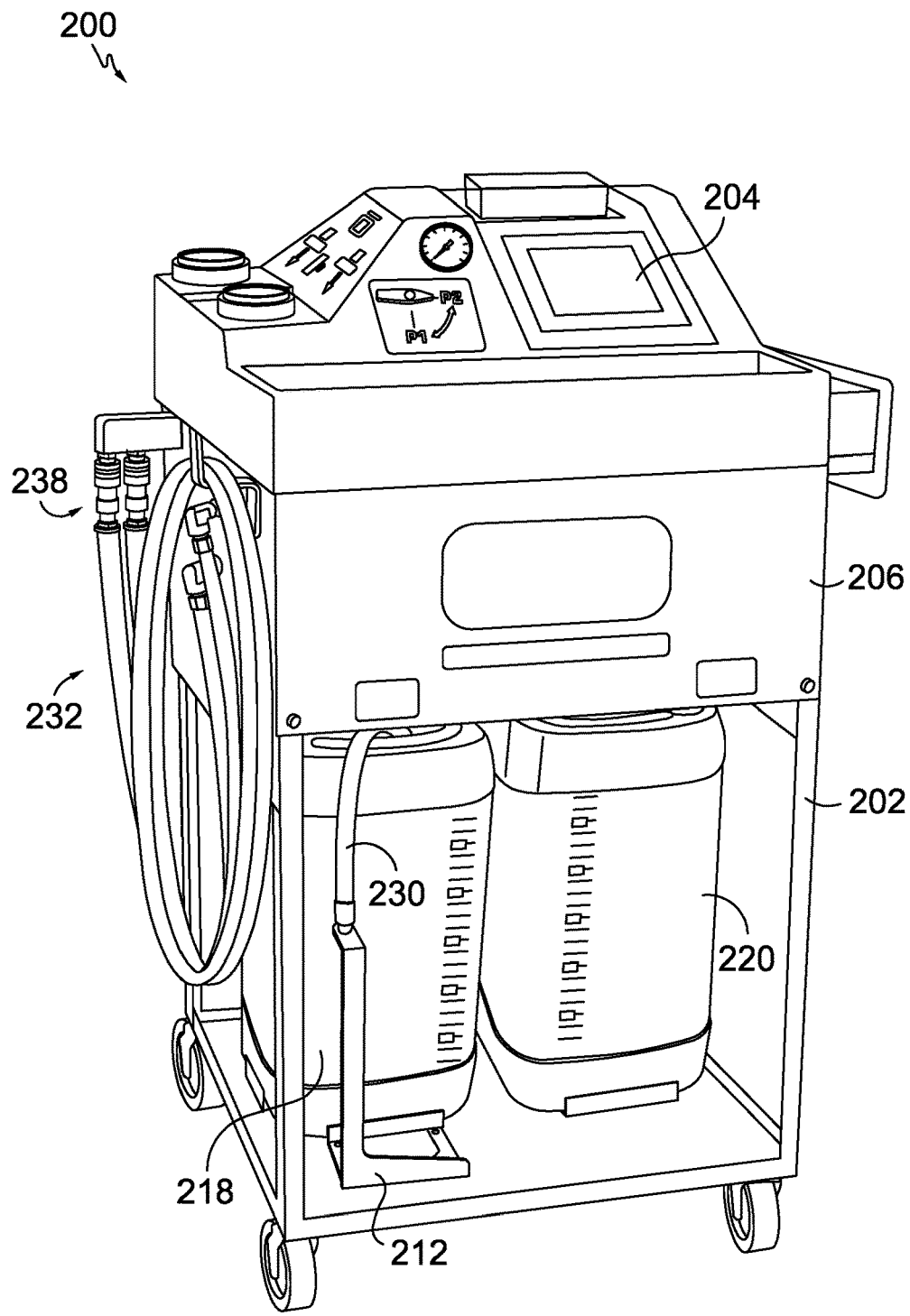
FIG. 48 is a front perspective view of an alternate embodiment of a fluid exchange machine in accordance with aspects herein.

Referring now to FIG. 48, an alternative embodiment of the present invention is shown in detail. In this alternative embodiment, the invention described with reference to FIGS. 1-47 has been modified to perform additional types of fluid exchanges for an automobile, depending on a user input. A fluid exchange machine 200 includes a frame 202, a display 204, and a housing 206. In general, the frame 202 and the housing 206 form an outer structure of the fluid exchange machine 200, such that the fluid exchange machine 200 may hold various components for performing fluid exchanges.

The display 204 is coupled to a processor (not shown in FIG. 48) for displaying various sets of instructions which walk the user through the different types of fluid exchanges available to be performed. These sets of instructions will be described in detail with reference to FIGS. 59-70. However, in general, these instructions may be accessed by selecting one of a grouping of icons on the display 204. For example, the processor may display an image having a first icon and a second icon thereon. Selecting the first icon may control activation of the new fluid pump and the used fluid pump to perform a first type of fluid exchange, and selecting the second icon may control activation of the new fluid pump and the used fluid pump to perform a second type of fluid exchange. In accordance with aspects herein, selecting a first icon may provide a set of instructions for performing a transmission fluid exchange, as seen in FIGS. 16-47. Additionally, in accordance with another aspect herein, selecting a second icon may provide a set of instructions for performing a power steering fluid exchange, as seen in FIGS. 59-69. However, it is contemplated herein that a first icon and a second icon may provide sets of instructions for any type of fluid exchange required by an automobile. Additionally, although the aspects described herein are generally directed to a first icon and a second icon, the inventors have contemplated that the processor may provide the display 204 with any number of icons for performing any number of fluid exchanges.

In accordance with aspects herein, fluid exchange machine 200 is described herein as being able to perform a transmission fluid exchange, as well as a power steering fluid exchange. However, it is contemplated herein that the fluid exchange machine 200 may be adapted to perform other types of fluid exchanges commonly required by automobiles.

With further reference to FIG. 48, the fluid exchange machine 200 may further comprise an auxiliary fluid tank support structure 212 for holding an auxiliary fluid tank (not shown in FIG. 48). Additionally, the fluid exchange machine 200 may further comprise a new fluid tank 218 for storing fluid which will be added during the process of the fluid exchange, and a used fluid tank 220 for storing fluid which will be removed from an automobile. In general, the new fluid tank 218 and the used fluid tank 220 are coupled to an automobile or vehicle by a pair of service hoses 232 having distal ends 238. One of the pair of service hoses 232 may be referred to as a delivery conduit 234, while the other hose of the pair of service hoses may be referred to as a removal conduit 236.

It is contemplated herein that the new fluid manifold 208 and the used fluid manifold 210 (both in FIG. 52) may be referred to herein as a first fluid manifold and a second fluid manifold, respectively. Likewise, the new fluid pump 213 and the used fluid pump 214 (both in FIG. 52) may be referred to as a first fluid pump and a second fluid pump, respectively. Similarly, the new fluid tank 218 and the used fluid tank 220 may be referred to as a first fluid tank and a second fluid tank, respectively. Again similarly, the auxiliary fluid tank support structure 212 and the auxiliary fluid tank 222 (FIG. 50) may be referred to as a third fluid tank support structure and a third fluid tank, respectively.

Figure 49:
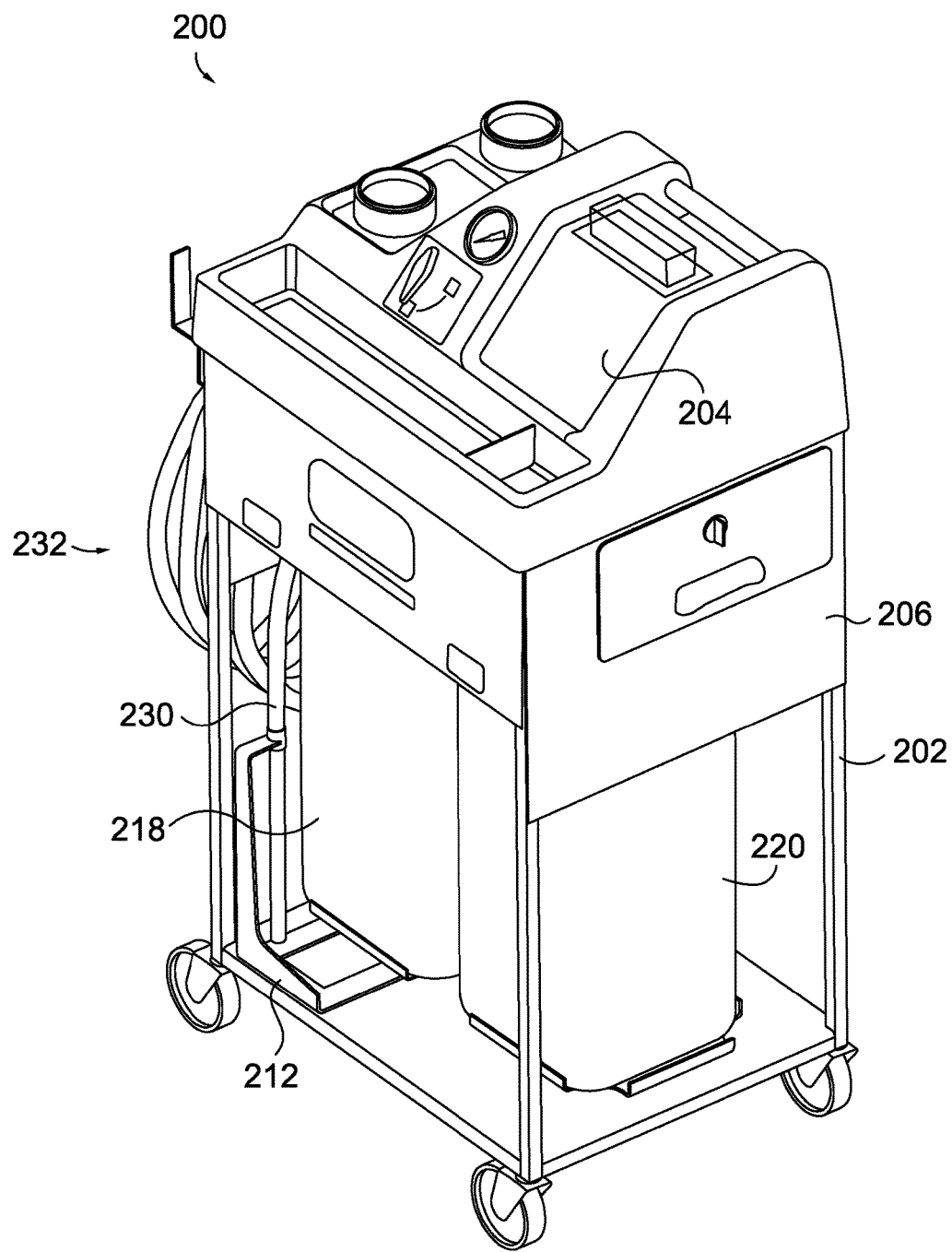
FIG. 49 is a right side perspective view of the fluid exchange machine of FIG. 48.
Figure 50:
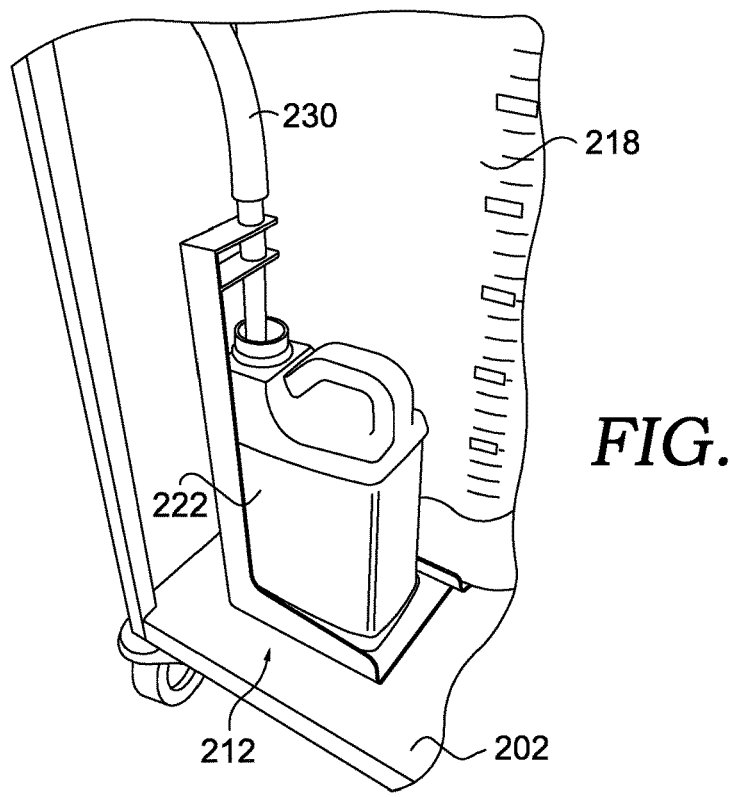
FIG. 50 is an enlarged fragmentary view of a portion of the machine of FIG. 48 illustrating an auxiliary fluid tank housed within an auxiliary fluid tank support structure.

Turning now to FIG. 49, a perspective view of the fluid exchange machine 200 shown in FIG. 48 is depicted. The fluid exchange machine 200 of FIG. 49 comprises all of the same components as the fluid exchange machine depicted in FIG. 48. However, the perspective view shown in FIG. 49 serves to further illustrate the relationship between various components of the fluid exchange machine 200, such as the frame 202, the display 204, and the housing 206. Additionally, FIG. 49 depicts that the auxiliary fluid tank support structure 212 further comprises an auxiliary hose 230. The auxiliary hose 230 is provided to allow for ease of use when connecting a new fluid manifold 208 (FIG. 52) to an auxiliary tank 222 (FIG. 50). In this aspect, the auxiliary hose 230 functions as an extension of the new fluid manifold 208. The relationships between the auxiliary hose 230, the auxiliary fluid tank support structure 212, a new fluid hose 231, and the new fluid manifold 208 may be seen in further detail at FIGS. 52-54.

Figure 51:
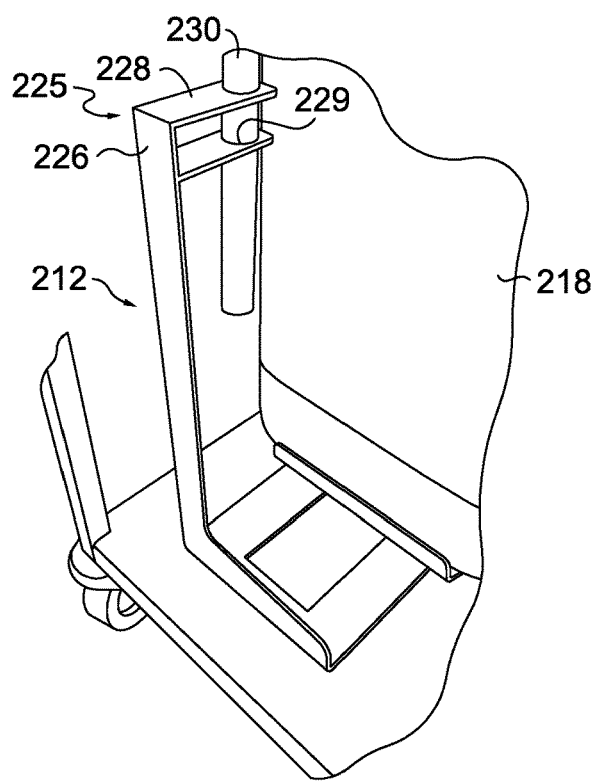
FIG. 51 is an enlarged fragmentary view of a portion of the machine of FIG. 48 further illustrating the auxiliary fluid tank support structure.

FIGS. 50 and 51 provide perspective views of the auxiliary fluid tank support structure 212, in accordance with aspects herein. The auxiliary fluid tank 222 is shown as housed within the auxiliary fluid tank support structure 212. In accordance with aspects herein, the auxiliary fluid tank 222 may house fluid which aids in the performance of a power steering flush of a vehicle. One such type of power steering flush fluid is known as BG Quick Clean, which is known to break down residue left in the automobile from the power steering fluid being replaced by the fluid exchange machine 200. However, BG Quick Clean is merely an exemplary type of power steering flush fluid, and the inventors have contemplated that any type of fluid which aids in performing a fluid exchange may be housed within the auxiliary fluid tank. For example, when the fluid exchange machine 200 is performing a transmission fluid exchange, it is contemplated that a fluid which cleans a transmission system of a vehicle is housed within the auxiliary tank 222. In some instances, it may be beneficial for the auxiliary fluid tank support structure 212 to have a base upon which the auxiliary fluid tank 222 rests raised up to 6 inches from a lower surface of the frame 202, so that the user does not have to bend all the way over when using a smaller auxiliary fluid tank 222.

With reference to FIG. 51, the auxiliary fluid tank support structure 212 will now be described in greater detail. In accordance with aspects herein, the auxiliary fluid tank support structure 212 is adapted to house an auxiliary fluid tank 222. Generally, the auxiliary fluid tank 222 has a capacity of one quart to three gallons. However, this range is merely exemplary, and the inventors have contemplated that the auxiliary fluid tank support structure 212 may be adapted to house any size of auxiliary fluid tank 222.

With continued reference to FIG. 51, the auxiliary fluid tank support structure 212 may further comprise a generally L-shaped bracket 225. The generally L-shaped bracket 225 may further comprise a long edge 226 and a short edge 228. Generally, the long edge 226 of the generally L-shaped bracket 225 is adapted to provide for adequate housing of the height of an auxiliary fluid tank 222, while the short edge 228 of the generally L-shaped bracket 225 is adapted to provide for adequate housing of the width or thickness of an auxiliary fluid tank 222. Additionally, the short edge 228 of the generally L-shaped bracket 225 is known to further comprise an aperture 229 extending therethrough, wherein the aperture is adapted to hold the auxiliary hose 230 which connects the auxiliary fluid tank 222 to the new fluid hose 231 and, in turn, to the new fluid conduit 208 (FIG. 52).

Figure 52:
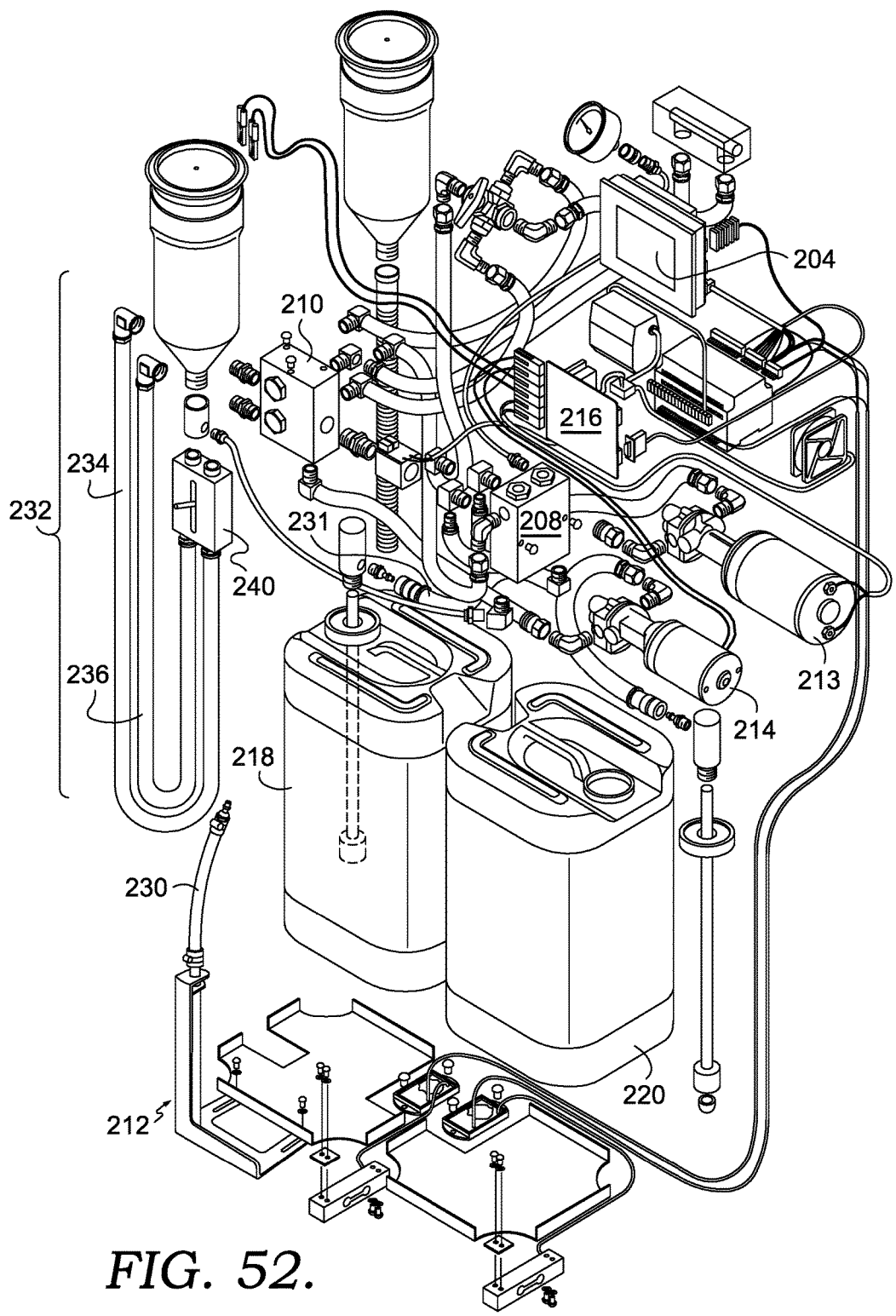
FIG. 52 is an exploded, perspective view of the machine of FIG. 48, from a front, top, right vantage point, and with a frame and housing removed to reveal various components of the machine.

Turning now to FIG. 52, an exploded, perspective view of the fluid exchange machine 200 is depicted. FIG. 52 is a perspective view from a front, top, right vantage point, and with the frame 202 and housing 206 removed to reveal various components of the machine. The fluid exchange machine 200 depicted in FIG. 52 shows a processor 216 coupled to a display 204 for displaying icons, images, and instructions thereon. Additionally, a new fluid pump 213 and a used fluid pump 214 are illustrated. The new fluid pump 213 may be in fluid communication with the new fluid tank 218, such that the new fluid pump 213 may drain or fill fluid from the new fluid tank 218. Similarly, the used fluid pump 214 may be in fluid communication with the used fluid tank 220, such that the used fluid pump may drain or fill fluid from the used fluid tank 220.

The new fluid manifold 208 may be coupled to the new fluid tank 218 by the new fluid hose 231 and to the new fluid pump 213, while the used fluid manifold 210 may be coupled to the used fluid tank 220 and the used fluid pump 214. Additionally, in accordance with one aspect, the auxiliary hose 230 may be coupled to the new fluid manifold 208 via the new fluid hose 231 to provide fluid communication between an auxiliary fluid tank 222 (not shown in FIG. 52) and the new fluid pump 213. In another aspect herein, the auxiliary hose 230 may be separate from the new fluid manifold 208, or the auxiliary hose 230 may be integrally formed into the new fluid manifold 208.

Further, the fluid exchange machine 200 may further comprise a pair of service hoses 232 for performing a fluid exchange with an automobile. As discussed supra, the pair of service hoses 232 may further comprise a delivery conduit 234 for delivering new fluid from the new fluid tank 218 via the new fluid pump 213. Additionally, the pair of service hoses 234 may further comprise a removal conduit 236 for delivering used fluid from the automobile to the used fluid tank 220 via the used fluid pump 214. Although the new fluid pump 213 and the used fluid pump 214 are generally known to provide fluid flow in one direction, it is contemplated herein that both the new fluid pump 213 and the used fluid pump 214 may provide fluid flow in either direction.

In yet another aspect, the pair of service hoses 232 may further comprise a device 240 for modulating the level of fluid in the new fluid tank 218 and the used fluid tank 220. This device 240 may comprise a lever for controlling the level of fluid in the fluid tanks as well. This device 240 may accomplish controlling the level of fluid in the fluid tanks through electrical coupling to the new fluid pump 213 and the used fluid pump 214, such that the device 240 controls the flow rate or suction levels of the new fluid pump 213 and the used fluid pump 214. This device may be coupled to the distal ends 238 of the service hoses 232, or may be placed at an intermediary point of the service hoses. This device 240 may be viewed in greater detail at FIG. 55.

Figure 53:
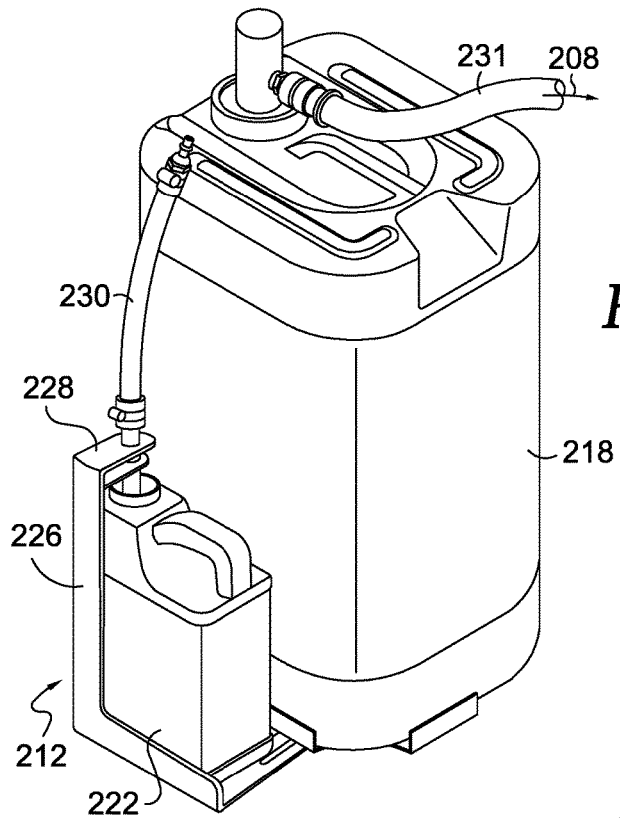
FIG. 53 is an enlarged perspective view of a portion of the machine of FIG. 48, illustrating a new fluid manifold in fluid communication with a new fluid tank, in accordance with aspects herein.
Figure 54:
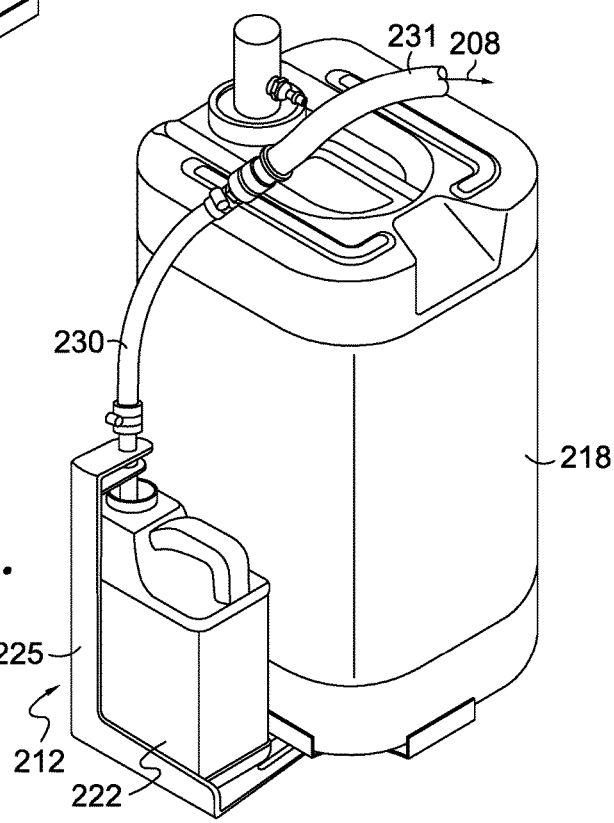
FIG. 54 is an enlarged perspective view of a portion of the machine of FIG. 48, illustrating the new fluid manifold in fluid communication with an auxiliary fluid tank, in accordance with aspects herein.

Turning now to FIGS. 53 and 54, the new fluid tank 218 is depicted as having a new fluid hose 231 connected in different configurations between the auxiliary fluid tank 222 and the new fluid tank 218. For example, the configuration depicted in FIG. 53 shows the new fluid hose 231 in fluid communication with the new fluid tank 218. Additionally, FIG. 53 shows that the auxiliary hose 230 may be separate from the new fluid hose 231. However, it is contemplated herein that the new fluid hose is simply constructed with a longer conduit at the end of the new fluid manifold 208, such that the new fluid hose may simply be placed directly into the auxiliary fluid tank 222.

In the embodiment depicted in FIG. 54, the auxiliary hose 230 is coupled directly to the new fluid hose 231. The coupling at the location where the auxiliary hose 230 is coupled to the new fluid hose 231 may generally comprise a "quick connect" type of coupling, similar to what would be found on the end of an air hose. However, the inventors have contemplated that this connection may be any type of coupling suitable for maintaining pressure throughout the auxiliary hose 230 and the new fluid hose 231. In other words, the new fluid hose 231 may either be connected directly to the new fluid tank 218 or may be coupled to the auxiliary hose 230.

Figure 55:
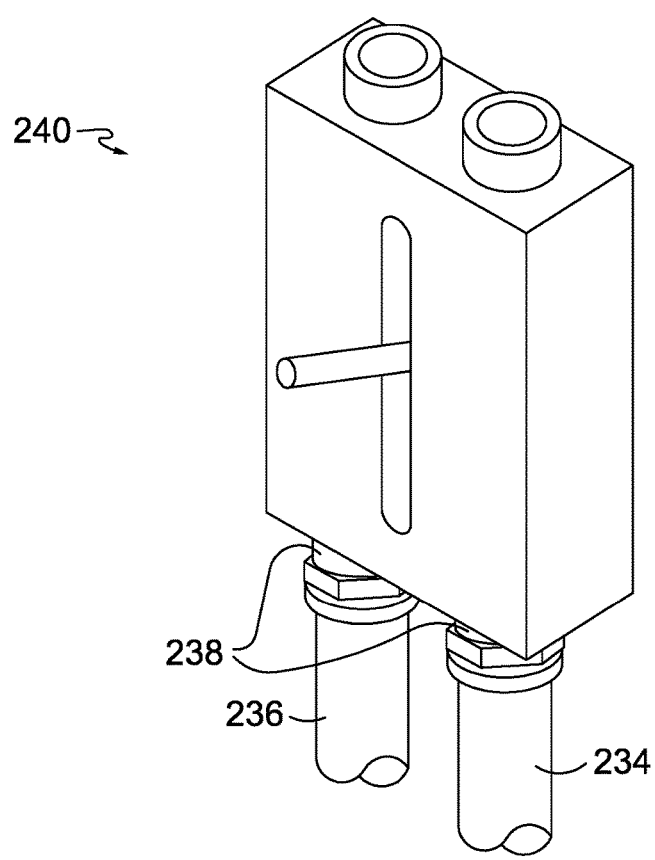
FIG. 55 is a perspective view of a device for controlling the fluid level in the new fluid tank and the used fluid tank, in accordance with aspects herein.

Turning now to FIG. 55, a perspective view of the device 240 for controlling the fluid level in the new fluid tank 218 and the used fluid tank 220 is depicted. As discussed supra, the distal ends 238 of the pair of service hoses 232 may be coupled to the device 240. However, in another embodiment, the device 240 may be coupled to the pair of service hoses 232 at any point along the length of the pair of service hoses, as long as the device 240 is operable to modulate the flow rate or suction pressure provided by the new fluid pump 213 (not shown in FIG. 55) and the used fluid pump 214 (also not shown in FIG. 55). The device 240 may further comprise a lever for providing proper modulation of the new fluid pump 213 and the used fluid pump 214. Additionally, the ends of the device 240 may be further provided with a pair of extension hoses (not shown) for providing the length necessary for coupling to an automobile.

Figure 56:
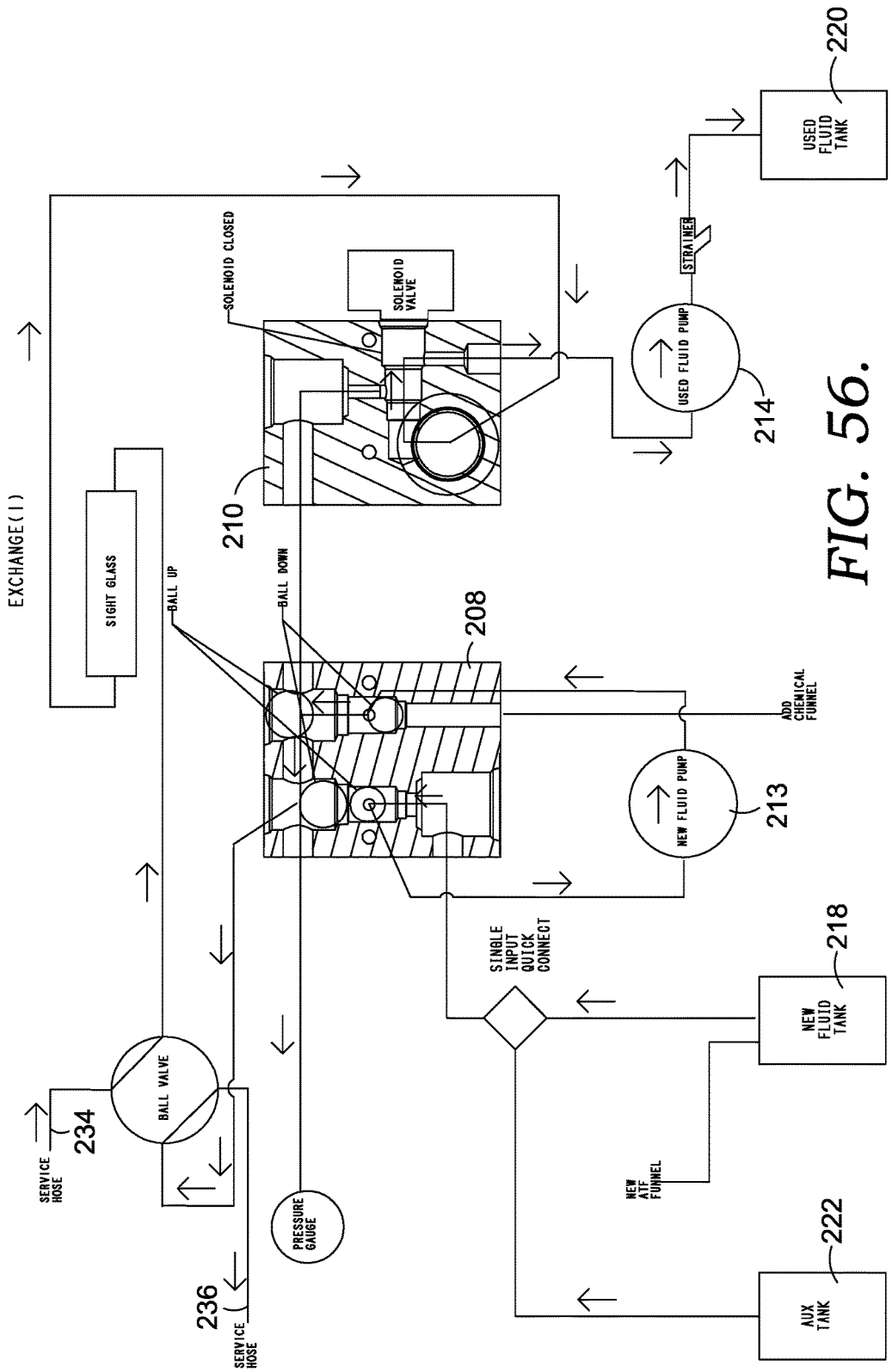
FIGS. 56-58 are schematic fluid flow diagrams of the machine of FIG. 48, in accordance with aspects herein.
Figure 57:
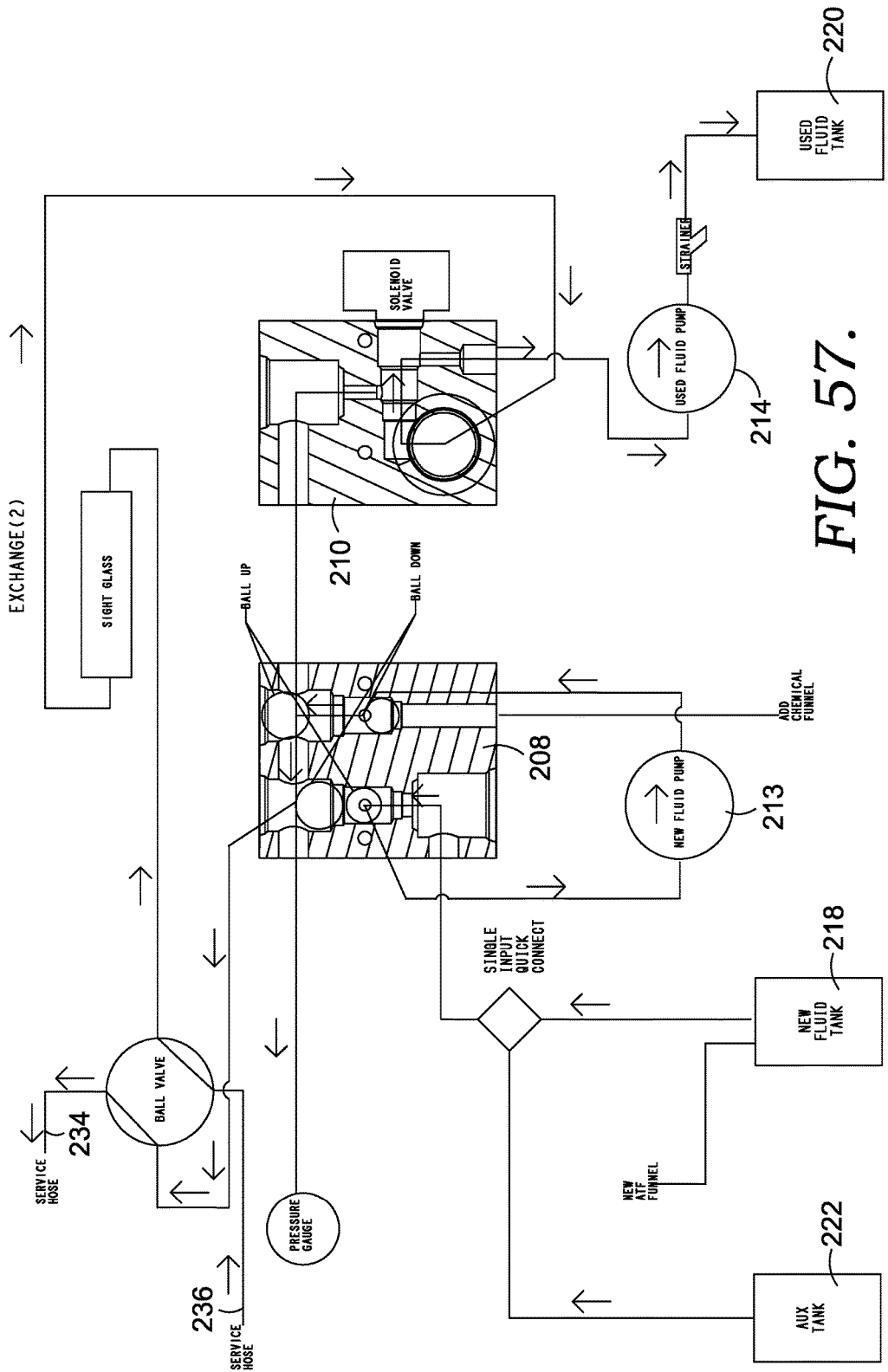
Figure 58:
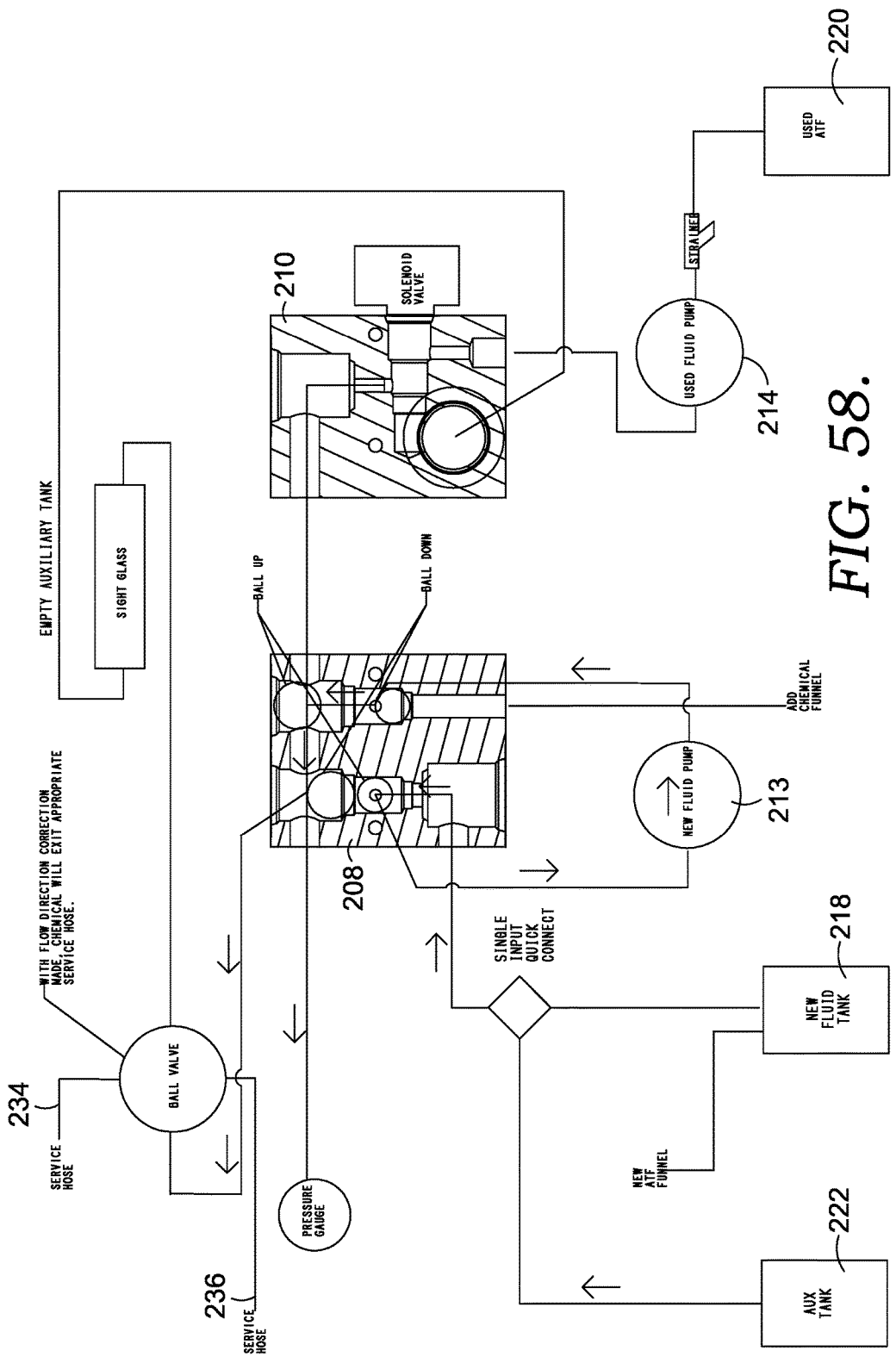

With reference to FIGS. 56-58, schematic fluid flow diagrams of the fluid exchange machine 200 are provided. Similar to FIGS. 11 and 12, FIGS. 56 and 57 illustrate the fluid exchange machine 200 operating in the exchange mode. FIG. 56 illustrates the top service hose as the delivery conduit 234, while also illustrating the bottom service hose as the removal conduit 236. Similarly, FIG. 57 also illustrates the top service hose as the delivery conduit 234, while also illustrating the bottom service hose as the removal conduit 236. However, both FIG. 56 and FIG. 57 have been modified to represent that the auxiliary fluid tank 222 is optionally coupled to the new fluid manifold 208. Additionally, during the exchange operation, the machine's electrical components are monitoring the amount of used fluid removed from a vehicle (not depicted in FIGS. 56 and 57) by weighing the new fluid tank 218 and the used fluid tank 220. In accordance with another aspect herein, the amount of fluid being withdrawn or deposited into the vehicle may also be calculated using a Venturi, or by simply calculating the flow rate through the pair of service hoses 232 and multiplying by the cross sectional area of the pair of service hoses 232. In this embodiment, the fluid exchange machine 200 is capable of maintaining an accurate measurement of the amount of the fluid being deposited or removed from the vehicle.

FIG. 57 illustrates a chemical injection mode of the fluid exchange machine 200. In this mode, the machine 200 is operated to introduce a chemical such as a cleaner or a conditioner to the vehicle's system. The desired chemical is poured into the machine, where the new fluid pump 213 is activated to draw the chemical through the new fluid manifold 208 and out through the new fluid pump 213 in a direction opposite of the flow during the exchange process.

FIG. 58 illustrates an empty new fluid tank mode where the fluid exchange machine 200 may be operated so as to withdraw fluid from either the new fluid tank 218 or the auxiliary fluid tank 222 and expel it into a suitable collection container (not shown). The fluid will not be pumped into a vehicle, but would be deposited into a storage container for safe keeping of the fluid for later use. This is similar to the process described above with reference to FIG. 15 and can be used to change the typed of fluid in the new fluid tank 218 or the auxiliary fluid tank 222 (although the auxiliary fluid tank 222 is often much smaller than the new fluid tank 218 and can simply be lifted up and swapped out with a different auxiliary fluid tank 222 containing the desired different fluid).

Turning now to FIGS. 59-69, we will now walk through the operation of the fluid exchange machine 200, as directed by the screenshots of FIGS. 59-69. Generally, the display 204 may be a monitor, a video display, a graphic display or the like and is used to direct the service technician or operator through the correct use of the fluid exchange machine 200 during an exchange procedure or service. This is accomplished by presenting the operator with a plurality of screenshots that tell them which steps to take.

Figure 59:
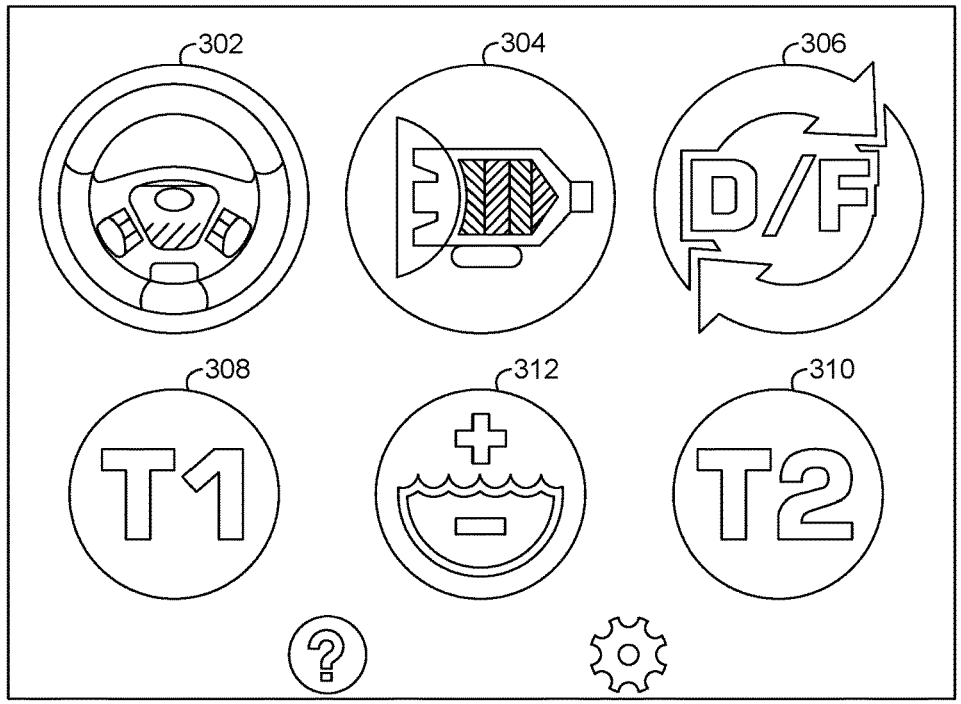
FIGS. 59-69 are drawings illustrating sample user interfaces displayed on a display of the machine for operating the machine of FIG. 48 to perform various tasks.

With reference to FIG. 59, an illustration of an exemplary screen that initially displays on the machine's display 204 at start up (i.e., the Home Screen) is provided. The screenshot shown in FIG. 59 provides the user with six different icons, each of which controls a different function of the fluid exchange machine 200. In general, selecting a first icon 302 provides the user with a first set of instructions for performing a power steering fluid exchange between a vehicle and the fluid exchange machine 200. The instructions depicted in FIGS. 60-69, in general, provide instructions for performing a power steering fluid exchange. However, it is contemplated that any or all of the screens from FIGS. 16-47 may be added to the first set of instructions for performing a power steering fluid exchange, in order to provide the user with more detailed instructions of what steps should be taken when working with a vehicle or automobile.

Still with reference to FIG. 59, a second icon 304 provides the user a second set of instructions for performing a second type of fluid exchange between the fluid exchange machine 200 and a vehicle or automobile. In general, selecting the second icon 304 provides the user with a second set of instructions, wherein the second set of instructions is for performing a transmission fluid flush. The instructions for performing a transmission fluid flush have been depicted in FIGS. 16-47. However, it is contemplated that any or all of the screens depicted in FIGS. 60-69 may be introduced into the instructions depicted by FIGS. 16-47, in order to provide a more detailed set of instructions for performing a transmission fluid exchange.

Additionally, as seen in FIG. 59, selecting a third icon 306 allows the user of the fluid exchange machine 200 to drain or fill either a new fluid tank 218, represented by a fourth icon 308, or a used fluid tank 220, represented by a fifth icon 310. For example, selecting the fourth icon 308 and then selecting the third icon 306 a single time operates the first fluid pump 213 to completely drain the new fluid tank 218, which may also be referred to as a first tank. Similarly, selecting the fourth icon 308 and then selecting the third icon 306 two times operates the first fluid pump 213 to completely fill the new fluid tank 218. The same method of draining or filling the new fluid tank 218 may be applied to draining or filling the used fluid tank 220, which may also be referred to as a second tank.

Figure 67:
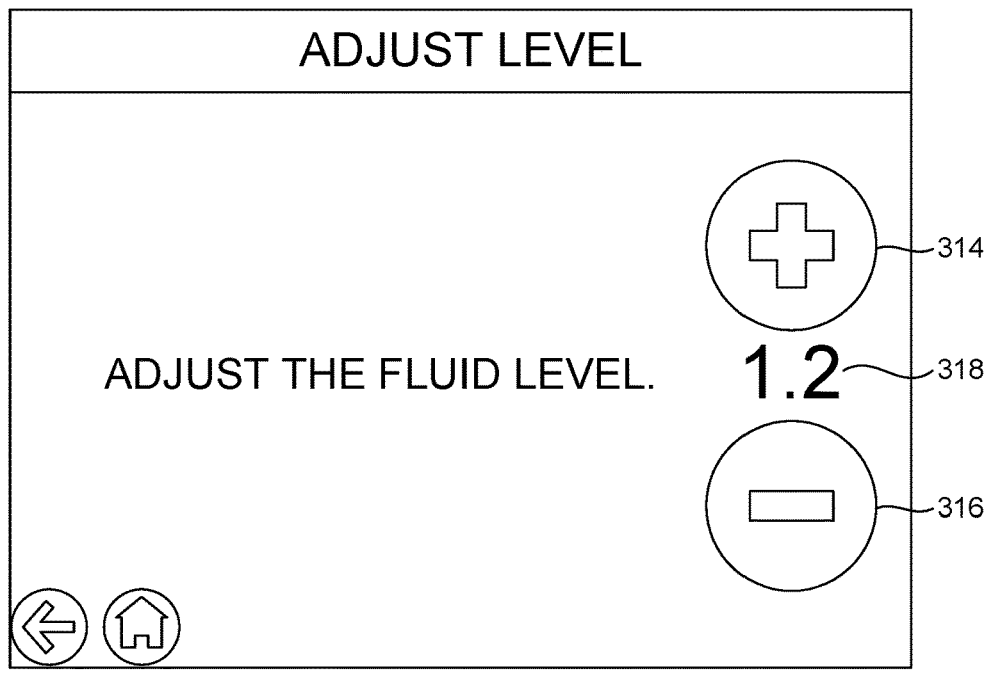
Figure 68:
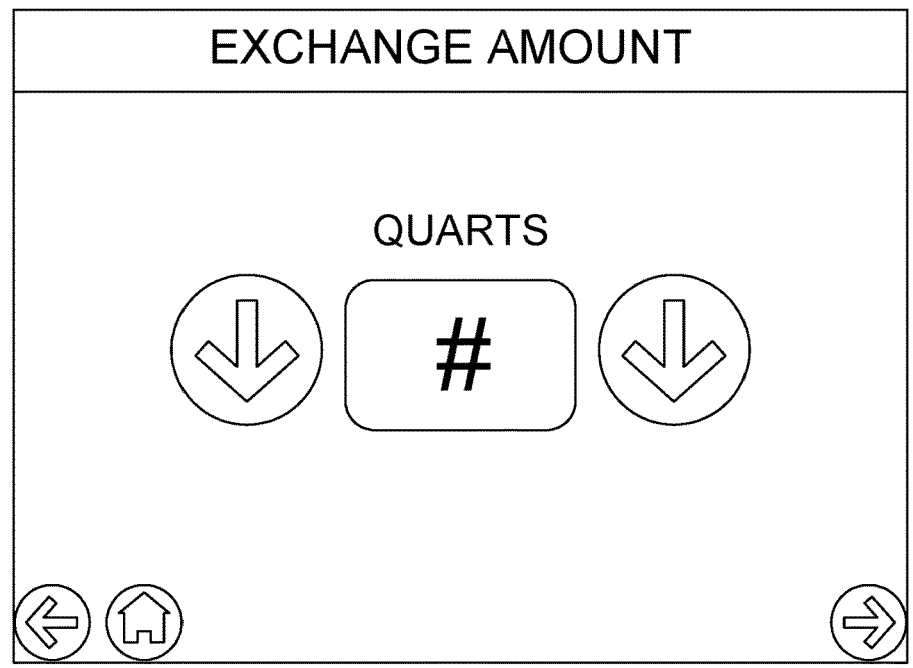

Finally, as still seen in FIG. 59, selecting a sixth icon 312 provides the user with a screen which is operable to control the level of fluid in either the new fluid tank 218 or the used fluid tank 220. In order to determine which tank has its fluid level controlled by the sixth icon, the fourth icon 308 or the fifth icon 310 must be selected. Once either the fourth icon 308 or the fifth icon 310 and the sixth icon 312 have been selected, the user is provided with the screen shown in FIG. 67. This screen provides the user with a simple plus icon 314 and a simple minus icon 316 for adjusting the level of fluid in the tank. Additionally, the screen depicted in FIG. 67 provides the user with a simple visual indicator 318 of the level of fluid in the tank. This visual indicator 318 represents the volume or weight of the fluid in either the new fluid tank 218 or the used fluid tank 220. Additionally, if the third icon 308 from FIG. 59 is selected, the fluid exchange machine 200 provides FIG. 68, which merely provides a screen which allows a user to input a desired amount of fluid exchange.

Figure 60:
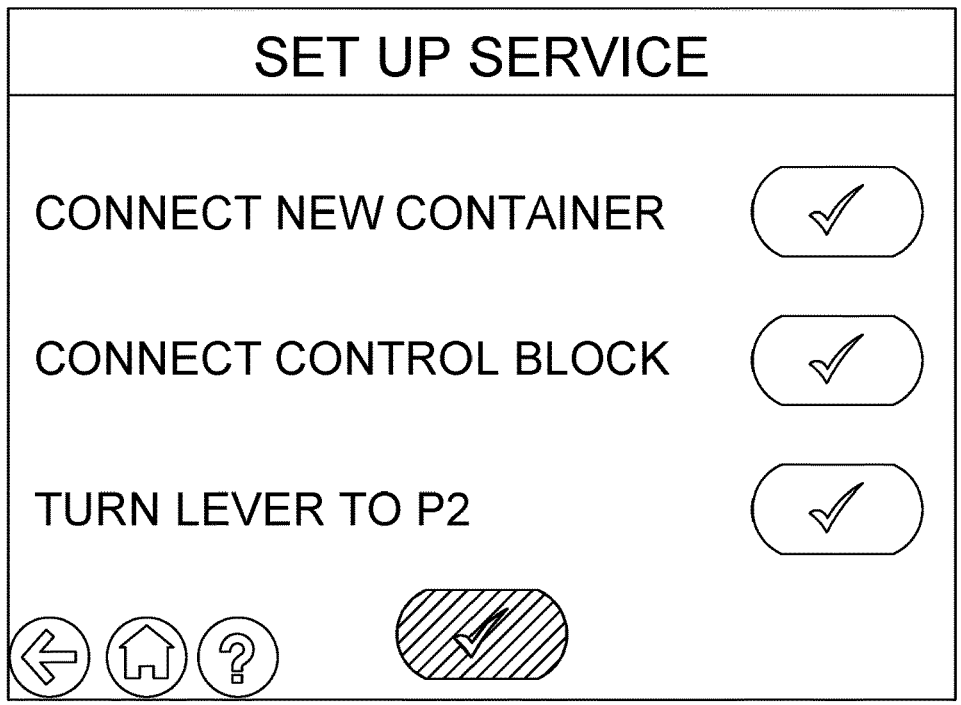

Now, referring to FIG. 60, an initial screenshot of the instructions for performing a power steering exchange is provided. The screenshot of FIG. 60 prompts the user to ensure that the following steps have been taken for performing a power steering exchange. These steps involve connecting a new container of fluid, connecting a control block (also referred to as device 240), and turning a lever to a position operable to allow for fluid flow through device 240.

Figure 61:
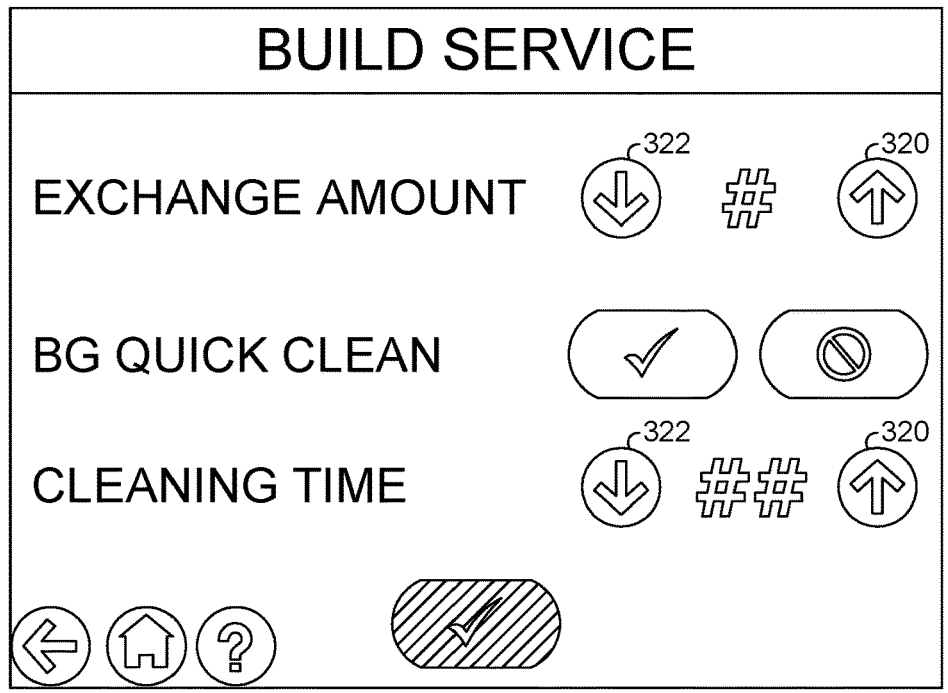

Once the steps provided by FIG. 60 have been completed, the display 204 provides the user with the screenshot depicted in FIG. 61. In FIG. 61, the fluid exchange machine 200 prompts the user to determine the proper amount of fluid to be exchanged, which may be adjusted by a simple up icon 320 or a simple down icon 322. Next, the fluid exchange machine 200 prompts the user to determine whether or not BG Quick Clean, also referred to as an auxiliary fluid, is being provided. Generally, the auxiliary fluid is housed within the auxiliary fluid tank 222, although the inventors have contemplated that the auxiliary fluid may be contained within the new fluid tank 218 as well. Finally, a user is prompted to input a desired amount of cleaning time, which is also adjusted via a simple up icon 320 or a simple down icon 322.

Figure 62:
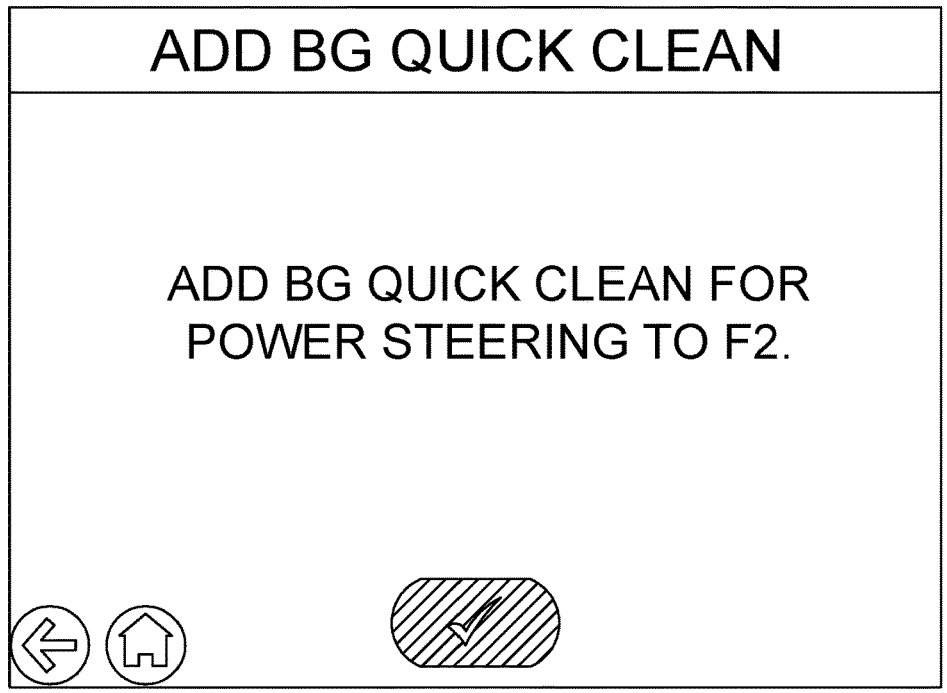
Figure 63:
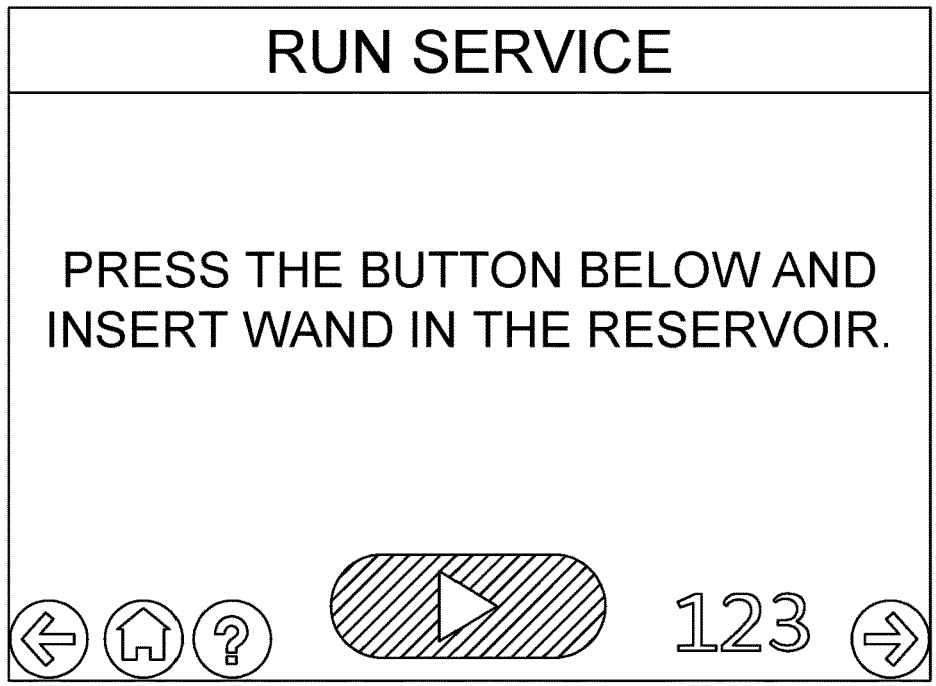
Figure 64:
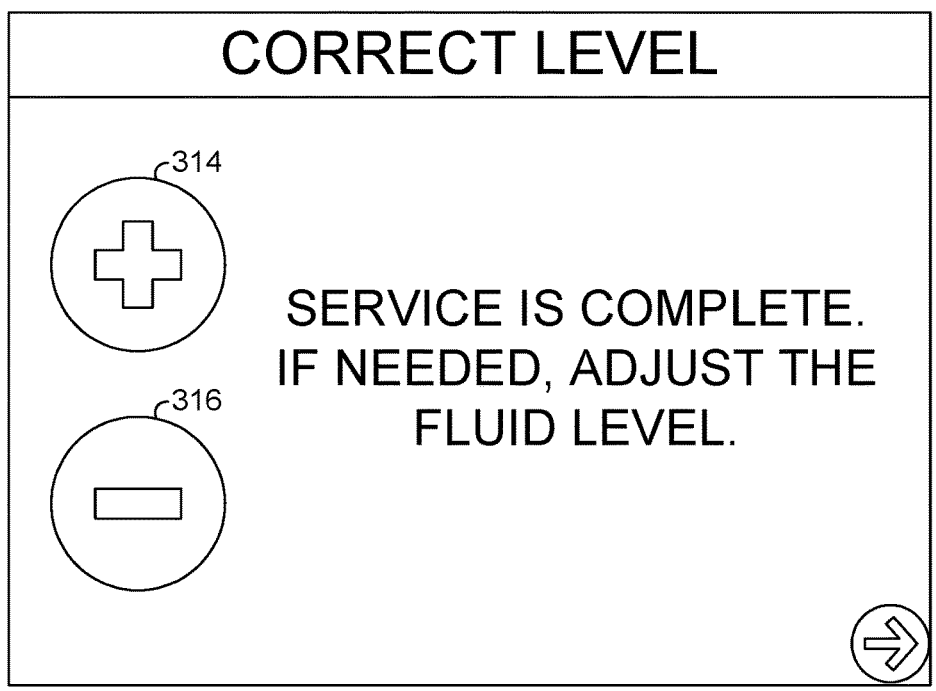

Once the steps described with reference to FIG. 61 have been successfully completed, the fluid exchange machine 200 provides the user with the screenshot depicted in FIG. 62, which simply prompts the user to add BG Quick Clean (or an auxiliary fluid) to the auxiliary fluid tank 222. Similarly, after the steps depicted in reference to FIG. 62 have been completed, the fluid exchange machine 200 provides the user with the screenshot depicted in FIG. 63, which prompts the user to insert a wand into a reservoir. From there, FIG. 64 is provided, which provides the user with a simple plus icon 314 and a simple minus icon 316 for determining the correct level of fluid desired within a power steering or transmission system of a vehicle.

Figure 65:
Figure 66:

If BG Quick Clean (or another auxiliary fluid) was added to a vehicle or automobile, the fluid exchange machine 200 displays FIG. 65 on the display 204. Likewise, if BG Quick Clean (or another auxiliary fluid) was not added to a vehicle or automobile, the fluid exchange machine 200 displays FIG. 66 on the display 204, indicating that the auxiliary fluid has not been added.

Figure 69:
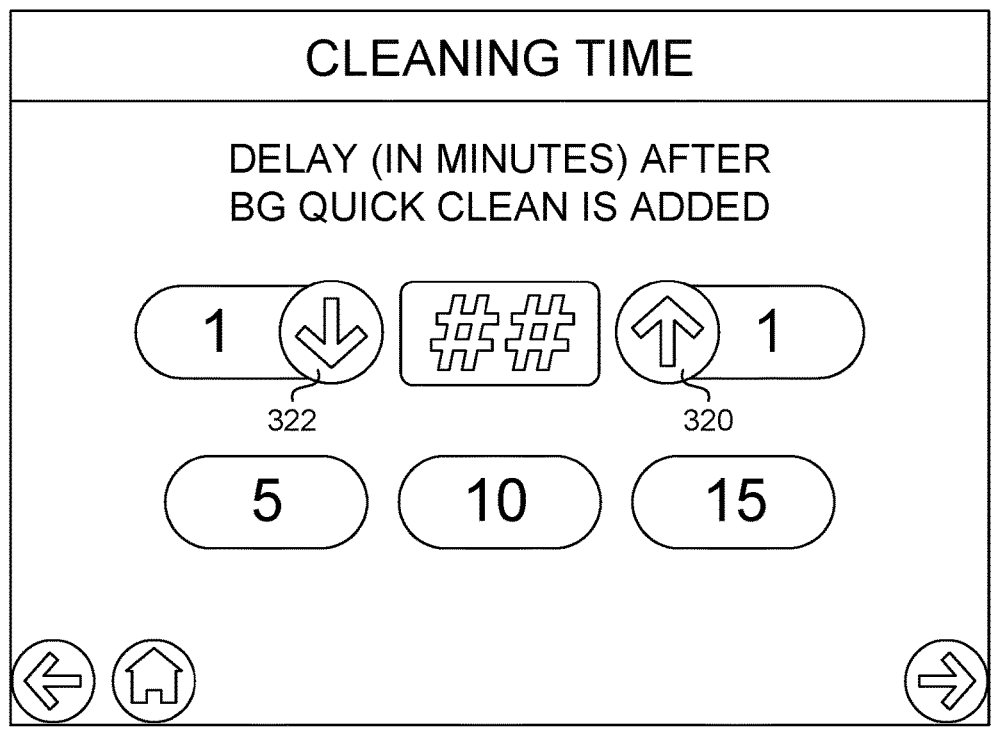

Next, FIG. 69 provides a screen that allows a user to input the amount of time that they would like BG Quick Clean, or another auxiliary fluid, to sit in a transmission or power steering system of an automobile. A visual indicator of the desired time may be adjusted via a simple up icon 320 or a simple down icon 322. Alternatively, a pre-made time input (which is generally measured in minutes) of 5, 10 or 15 minutes may be selected.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

The invention claimed is:

1. A fluid exchange machine comprising:
a frame having a housing;
a display coupled with the housing;
a new fluid manifold and a used fluid manifold, the new fluid manifold and used fluid manifold coupled with the housing and in fluid communication with each other;
an auxiliary fluid tank support structure coupled with the housing;
a new fluid pump and a used fluid pump, the new fluid pump coupled with the new fluid manifold and the used fluid pump coupled with the used fluid manifold;
a processor coupled with the display for displaying an image having a first icon and a second icon thereon, wherein the first icon controls activation of the new fluid pump and the used fluid pump to perform a first type of fluid exchange, and wherein the second icon controls activation of the new fluid pump and the used fluid pump to perform a second type of fluid exchange;
a used fluid tank for holding used fluid, the used fluid tank supported by the frame, wherein the used fluid pump is selectively in communication with the used fluid tank and is operable to selectively withdraw fluid from the used fluid tank and dispense fluid into the used fluid tank;
a new fluid tank for holding new fluid, the new fluid tank supported by the frame, wherein the new fluid pump is selectively in communication with the new fluid tank and is operable to selectively withdraw fluid from the new fluid tank and dispense fluid into the new fluid tank; and
an auxiliary fluid tank for holding auxiliary fluid, wherein the new fluid pump is selectively in communication with the auxiliary fluid tank and is operable to selectively withdraw fluid from the auxiliary fluid tank and dispense fluid into the auxiliary fluid tank.

2. The fluid exchange machine of claim 1, wherein the auxiliary fluid is adapted to clean a power steering system of a vehicle.

3. The fluid exchange machine of claim 1, wherein the auxiliary fluid tank support structure further comprises a generally L-shaped bracket having a short edge and a long edge, wherein a short edge of the generally L-shaped bracket comprises an aperture extending therethrough.

4. The fluid exchange machine of claim 3, wherein the auxiliary fluid tank support structure further comprises an auxiliary hose, wherein the aperture of the short edge of the generally L-shaped bracket is adapted to enclose at least a portion of an auxiliary hose.

5. The fluid exchange machine of claim 1, wherein the auxiliary fluid tank support structure has a base and wherein the base is elevated up to 6 inches above a lower surface of the frame.

6. The fluid exchange machine of claim 1, further comprising a pair of service hoses extending from the machine, wherein the hoses are in fluid communication with the used fluid manifold and the new fluid manifold.

7. The fluid exchange machine of claim 6, wherein the service hoses further comprise a delivery conduit and a removal conduit.

8. The fluid exchange machine of claim 7, wherein the service hoses further comprise a device operable to control a level of fluid in the new fluid tank, the used fluid tank and the auxiliary fluid tank.

9. The fluid exchange machine of claim 1, wherein the auxiliary fluid tank support structure is adapted to support an auxiliary fluid tank having a capacity of one quart to three gallons.

10. The fluid exchange machine of claim 9, wherein the pair of service hoses have distal ends for coupling with a transmission system of a vehicle when a first icon on the image is selected, whereby transmission fluid in the transmission system may flow through the fluid exchange machine when the fluid exchange machine is coupled with the transmission system via the service hoses.

11. The fluid exchange machine of claim 9, wherein the distal ends of the hoses are coupled to a power steering system of a vehicle when the second icon on the image is selected, whereby power steering fluid may flow through the fluid exchange machine when the machine is coupled with the power steering system via the service hoses.

12. A fluid exchange machine comprising:
a frame having a housing;
a display coupled with the housing;
a first fluid manifold and a second fluid manifold, wherein the first fluid manifold and the second fluid manifold are coupled with the housing and in fluid communication with each other;
a first fluid pump and a second fluid pump, the first fluid pump coupled with the first fluid manifold and the second fluid pump coupled with the second fluid manifold;
a processor coupled with the display for displaying an image having a first icon and a second icon thereon, wherein the first icon controls activation of the first fluid pump and the second fluid pump to perform a first type of fluid exchange, and wherein the second icon controls activation of the first fluid pump and the second fluid pump to perform a second type of fluid exchange;
a first fluid tank for holding a first fluid, the first fluid tank supported by the frame, wherein the first fluid pump is selectively in communication with the first fluid tank and is operable to selectively withdraw the first fluid from the first fluid tank and dispense fluid into the first fluid tank;
a second fluid tank for holding a second fluid, the second fluid tank supported by the frame, wherein the second fluid pump is selectively in communication with the second fluid tank and is operable to selectively withdraw the second fluid from the second fluid tank and dispense fluid into the second fluid tank;
a third fluid tank support structure, wherein a lower surface of the third fluid tank support structure is raised up to 6 inches from a lower surface of the frame, and wherein the third fluid tank support structure further comprises a generally L-shaped bracket; and
a third fluid tank adjacent the third fluid tank support structure, wherein the third fluid tank is adapted to hold a third fluid, and wherein the second fluid pump is selectively in communication with the third fluid tank and is operable to selectively withdraw fluid from the third fluid tank and dispense fluid into the third fluid tank.

13. The fluid exchange machine of claim 12, wherein the first fluid manifold is in fluid communication with the third fluid tank.

* * * * *